United States Patent [19]

Ichikawa

[11] Patent Number: 5,314,738
[45] Date of Patent: May 24, 1994

[54] REINFORCED COMPOSITE CORRUGATE BODY

[76] Inventor: Hiroo Ichikawa, 18-9, Nishi-Waseda 3-chome, Shinjuku-ku, Tokyo 160, Japan

[21] Appl. No.: 796,916
[22] Filed: Nov. 22, 1991

Related U.S. Application Data

[63] Continuation of Ser. No. 613,536, Nov. 6, 1990, abandoned.

[51] Int. Cl.⁵ .............................................. B32B 3/28
[52] U.S. Cl. .................................... 428/182; 428/179; 428/212; 428/184; 428/186
[58] Field of Search .............. 428/182, 183, 192, 179, 428/119, 120, 174, 212, 184, 186; 52/795, 801

[56] References Cited

U.S. PATENT DOCUMENTS

| | | | |
|---|---|---|---|
| 2,963,128 | 12/1960 | Rapp | 428/182 |
| 3,698,879 | 10/1972 | Lucien | 428/180 |
| 3,992,162 | 11/1976 | Gewiss | 428/179 |

FOREIGN PATENT DOCUMENTS

| | | |
|---|---|---|
| 46-1754 | 1/1971 | Japan . |
| 60-5462 | 2/1985 | Japan . |
| 62-184848 | 8/1987 | Japan . |
| 62-185037 | 11/1987 | Japan . |
| 62-284737 | 12/1987 | Japan . |
| 64-8031 | 1/1989 | Japan . |

*Primary Examiner*—Donald J. Loney
*Attorney, Agent, or Firm*—Wenderoth, Lind & Ponack

[57] ABSTRACT

The strength and workability of a reinforced composite corrugated body are improved. A corrugated body is constituted such that corrugate lines provided with vertically spaced ridges and grooves formed alternately in a sheet material are formed in a smooth meandering waveform in a horizontal direction. The corrugate lines have a substantial amplitude ratio H/L higher than or equal to 0.4 but lower than or equal to 1.4, a substantial meandering ratio D/N lower than or equal to 0.35, a substantial meandering overlapping ratio higher than or equal to 0.5 and a width narrowing ratio i in the advancing direction of the corrugate lines lower than or equal to 8% plus a stretch strain ratio of the sheet material. Sectional shapes of crest and bottom portions of the corrugate lines are curved or chamfered with a small width. A flat liner is adhered to at least one of the opposite faces of the resultant corrugated body.

5 Claims, 29 Drawing Sheets

L —— Period of Sectional Waveform

Ho —— Amplitude of Sectional Waveform

H —— Substantial Amplitude of Sectional Waveform

W —— Bending Width of Sectional Waveform

F I G. 3(A)
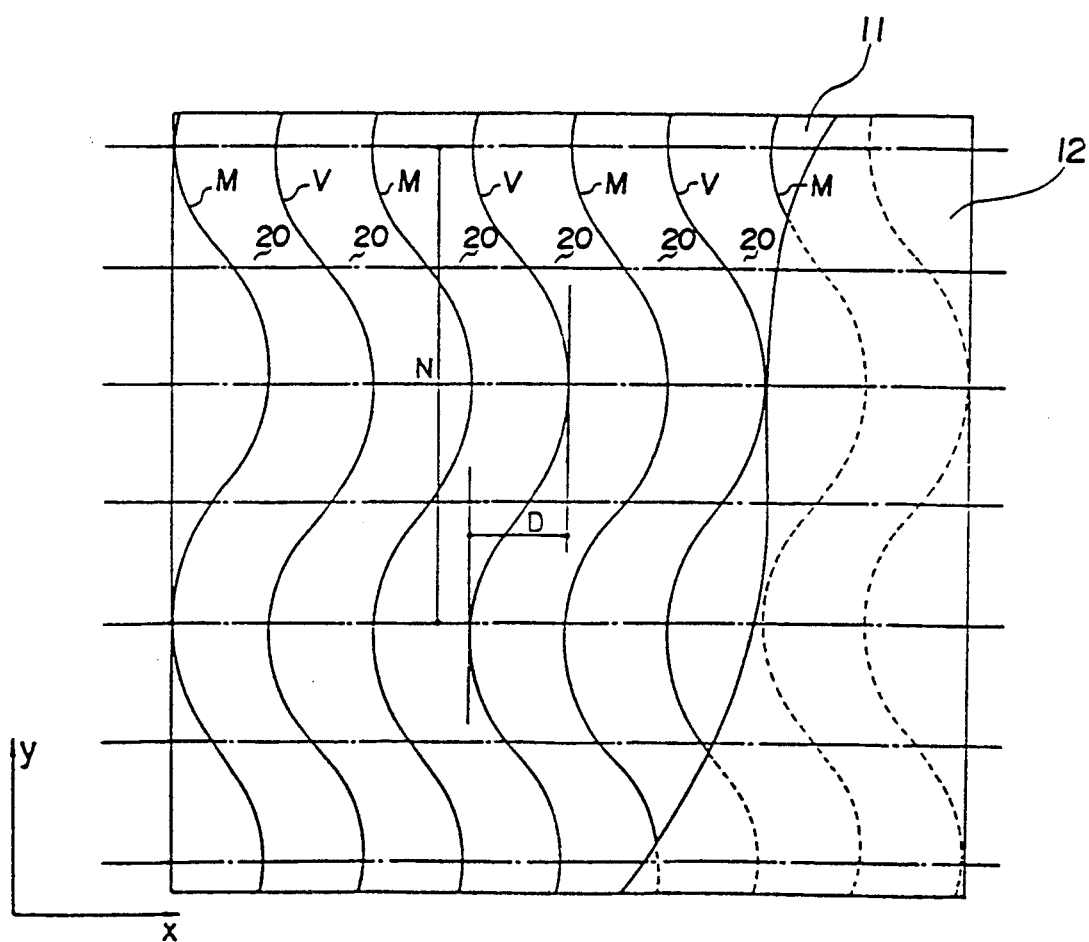

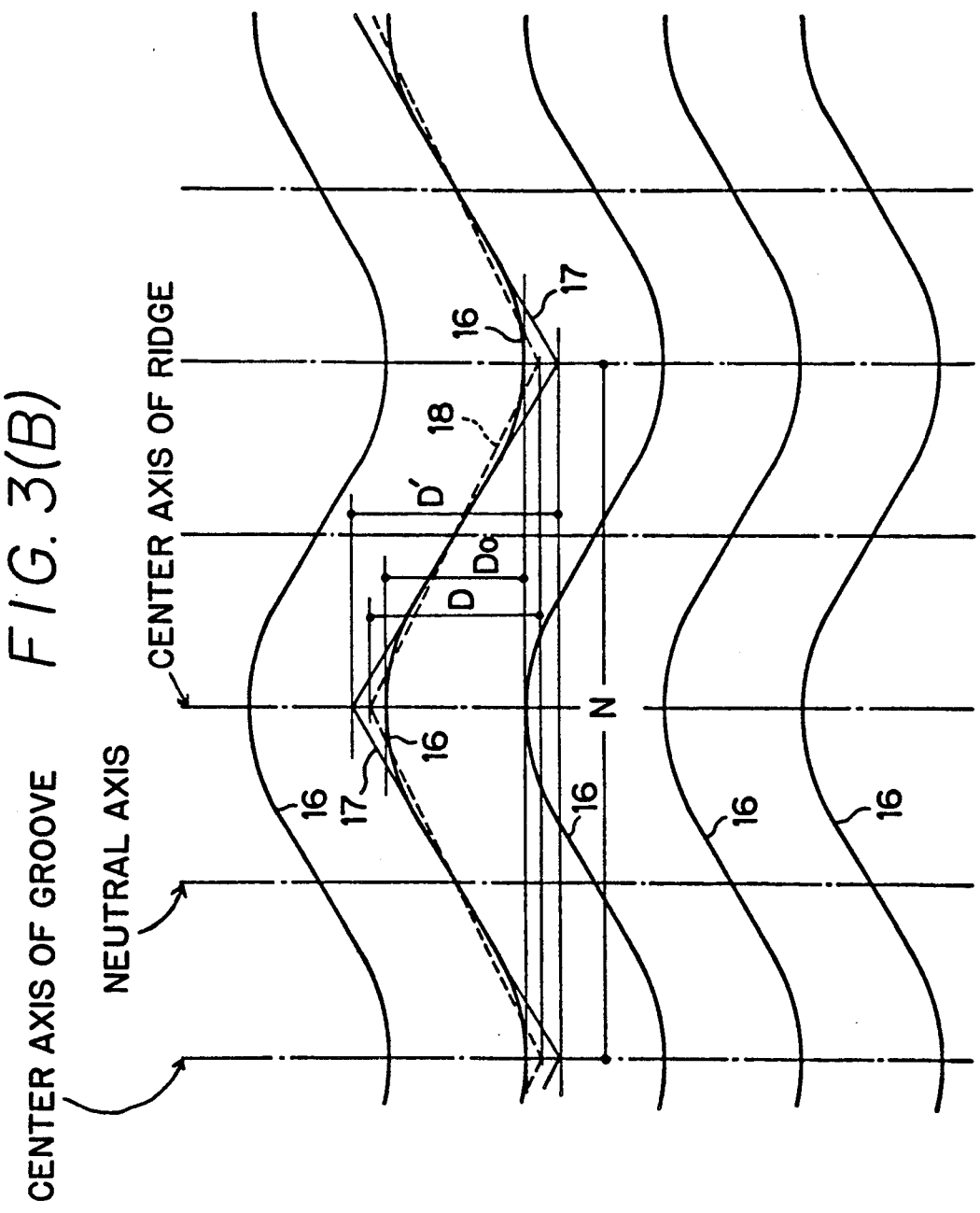

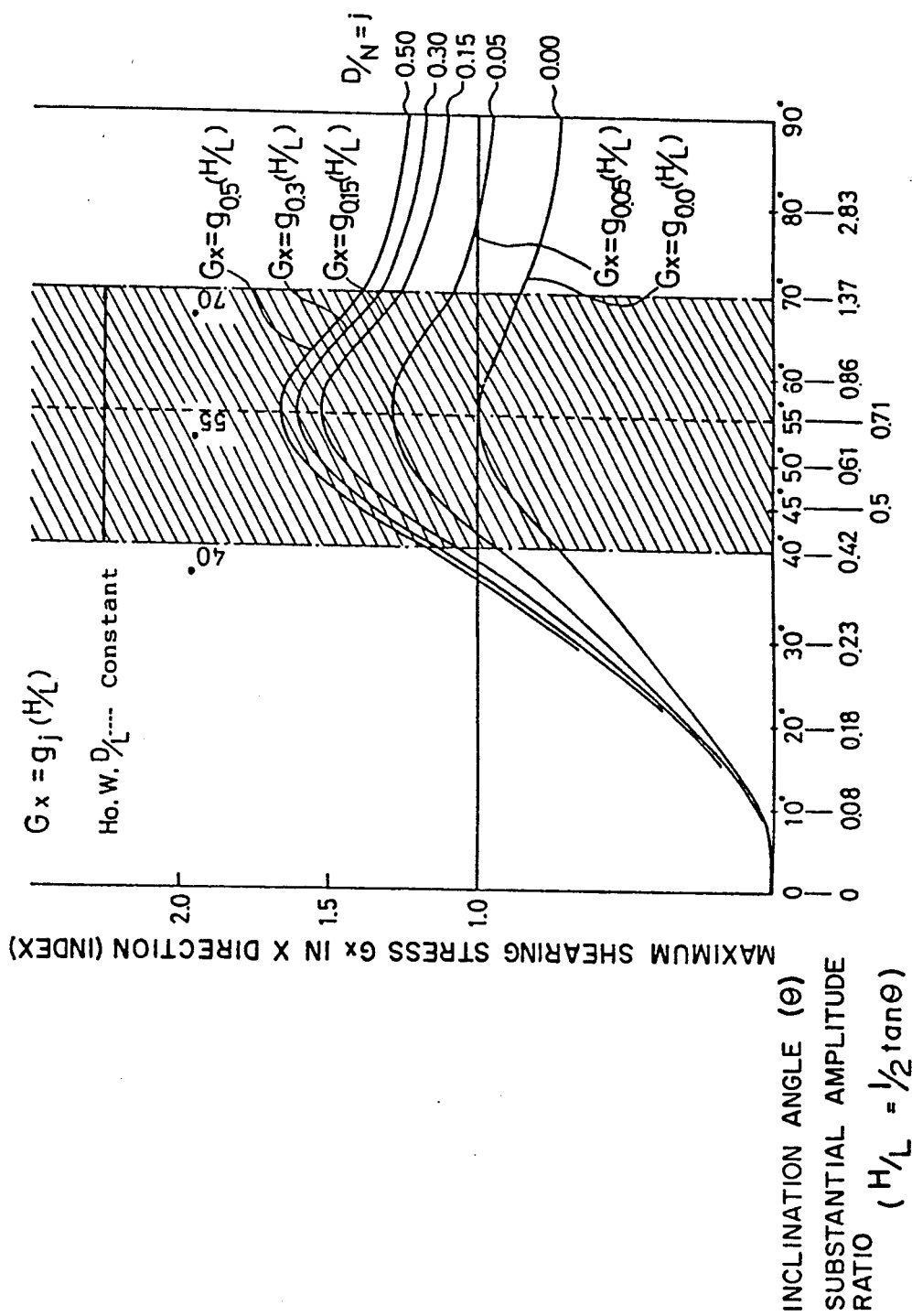

FIG. 8(A)
D/L = 0.4
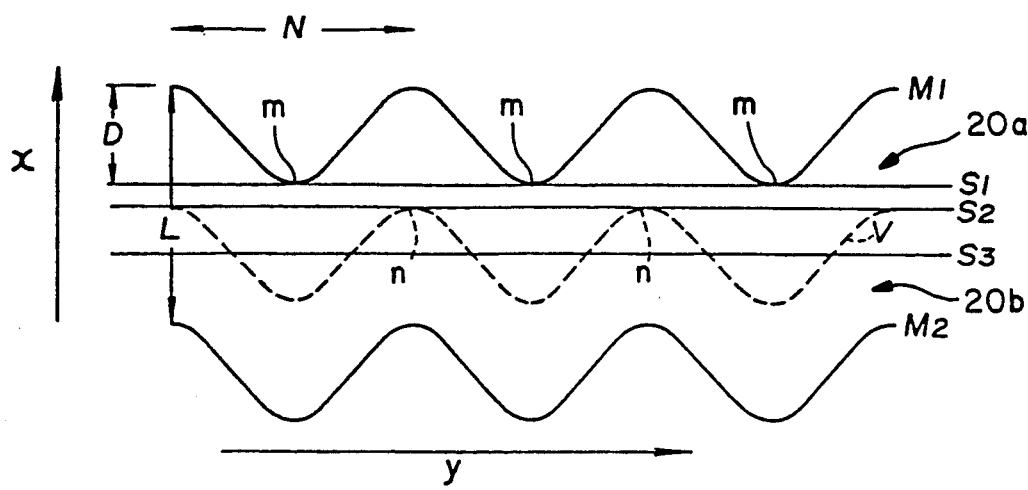
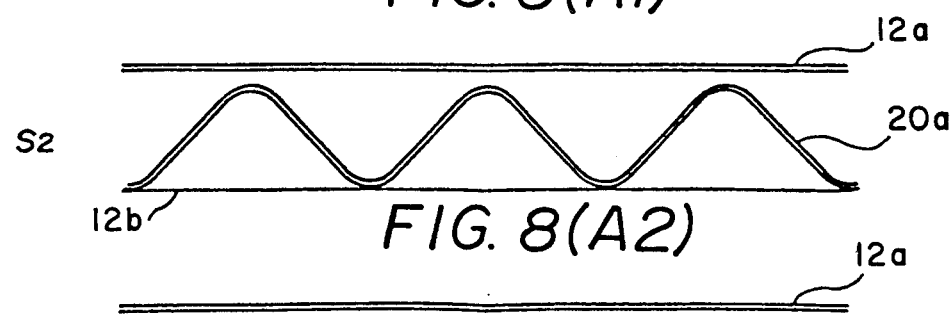
FIG. 8(A1)
FIG. 8(A2)
FIG. 8(A3)

FIG. 8(B)
D/L = 0.5
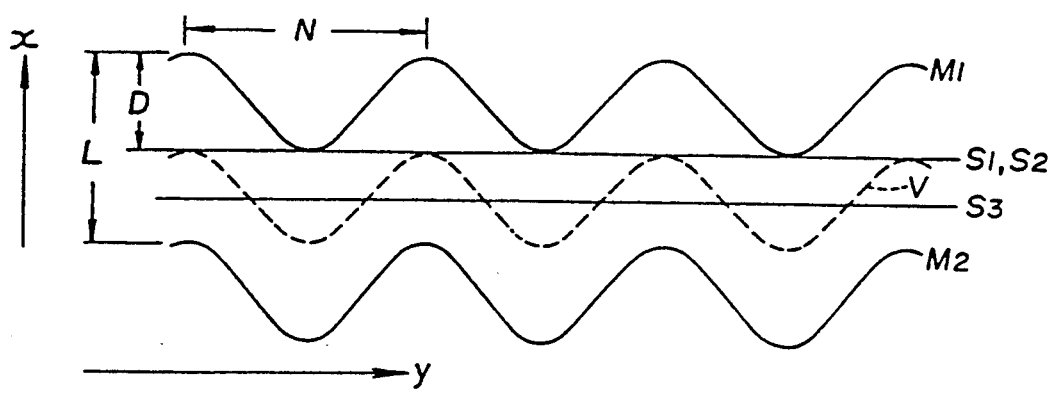
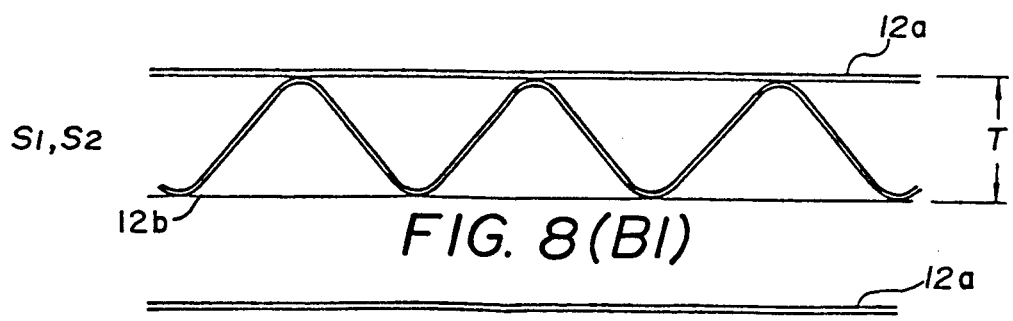
FIG. 8(B1)
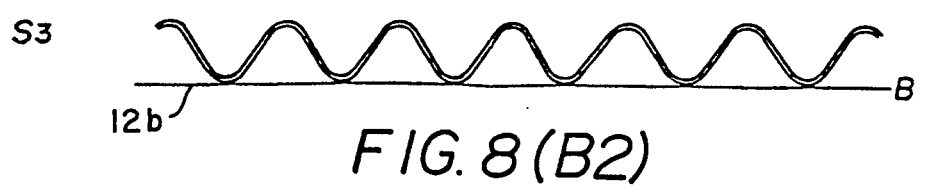
FIG. 8(B2)

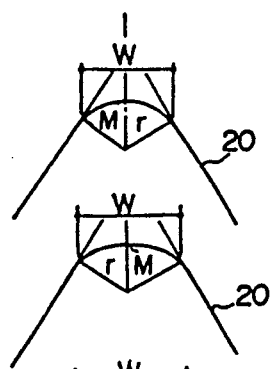
FIG. 9(A-1)
FIG. 9(A-2)
FIG. 9(A-3)
FIG. 9(A-4)
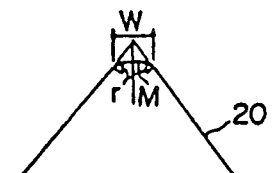
FIG. 9(B-1)
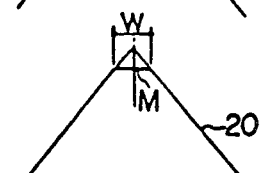
FIG. 9(B-2)
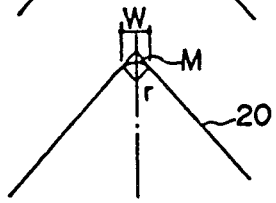
FIG. 9(B-3)
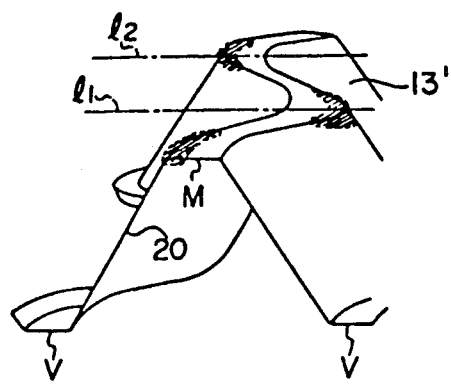
FIG. 12

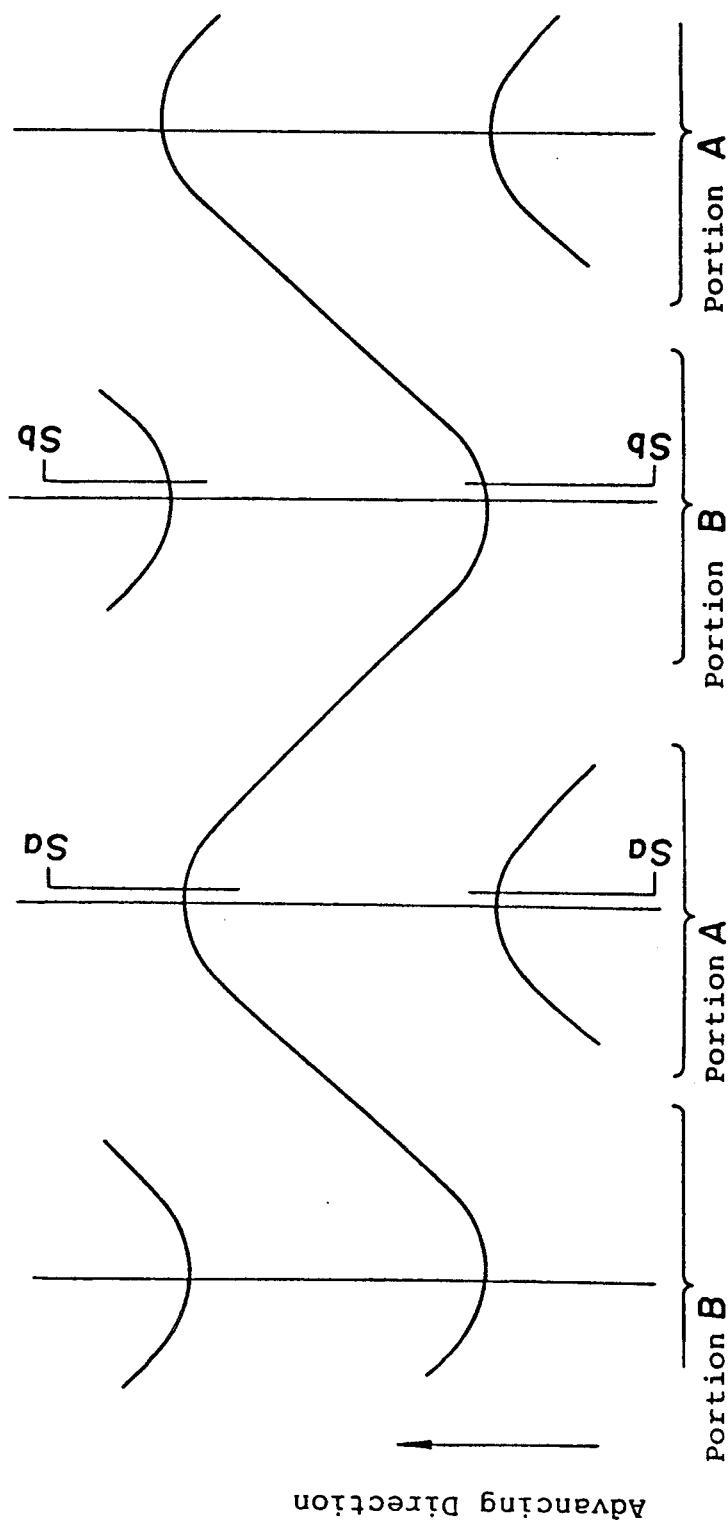

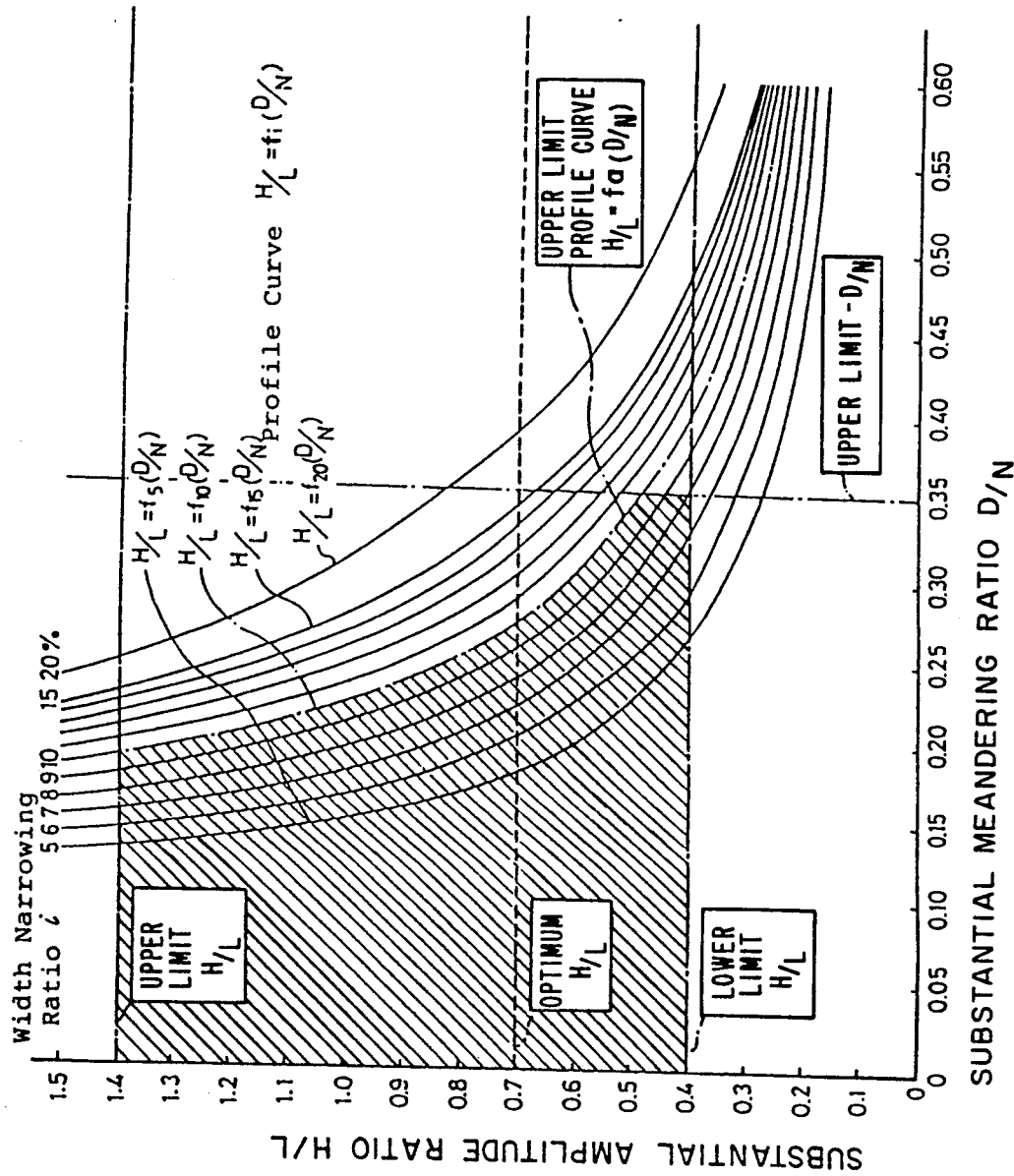

FIG. 17(A)
PRIOR ART
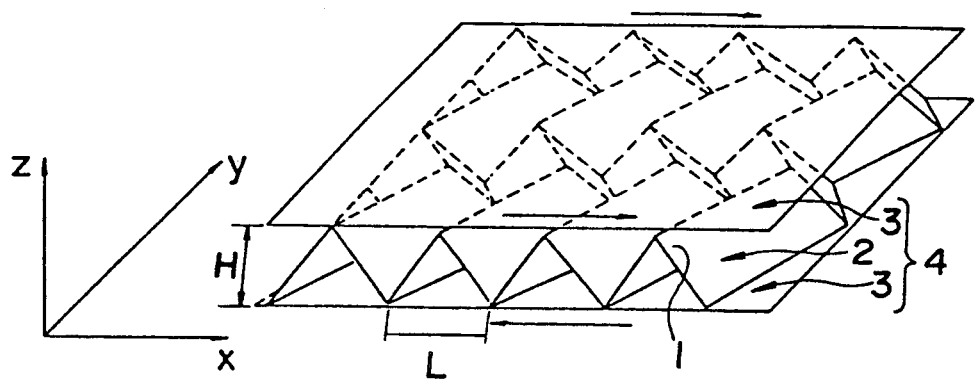
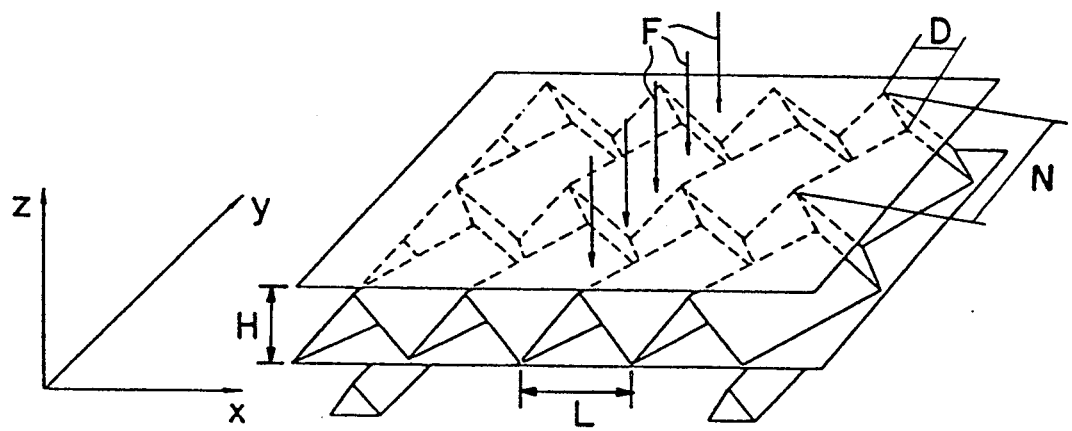
FIG. 17(B)
PRIOR ART

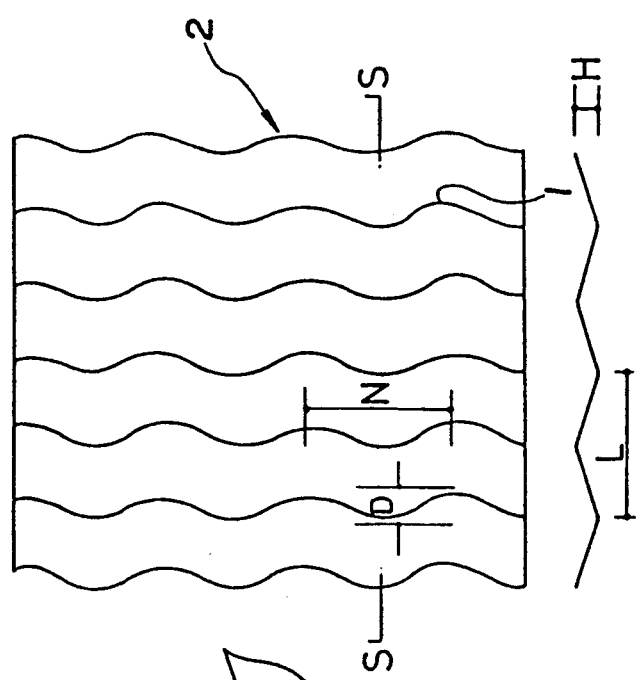
FIG. 18(B) PRIOR ART
FIG. 18(C) PRIOR ART
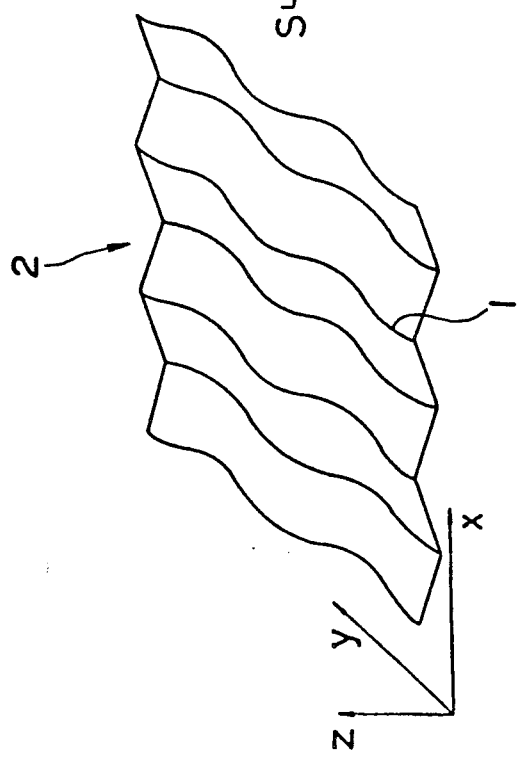
FIG. 18(A) PRIOR ART

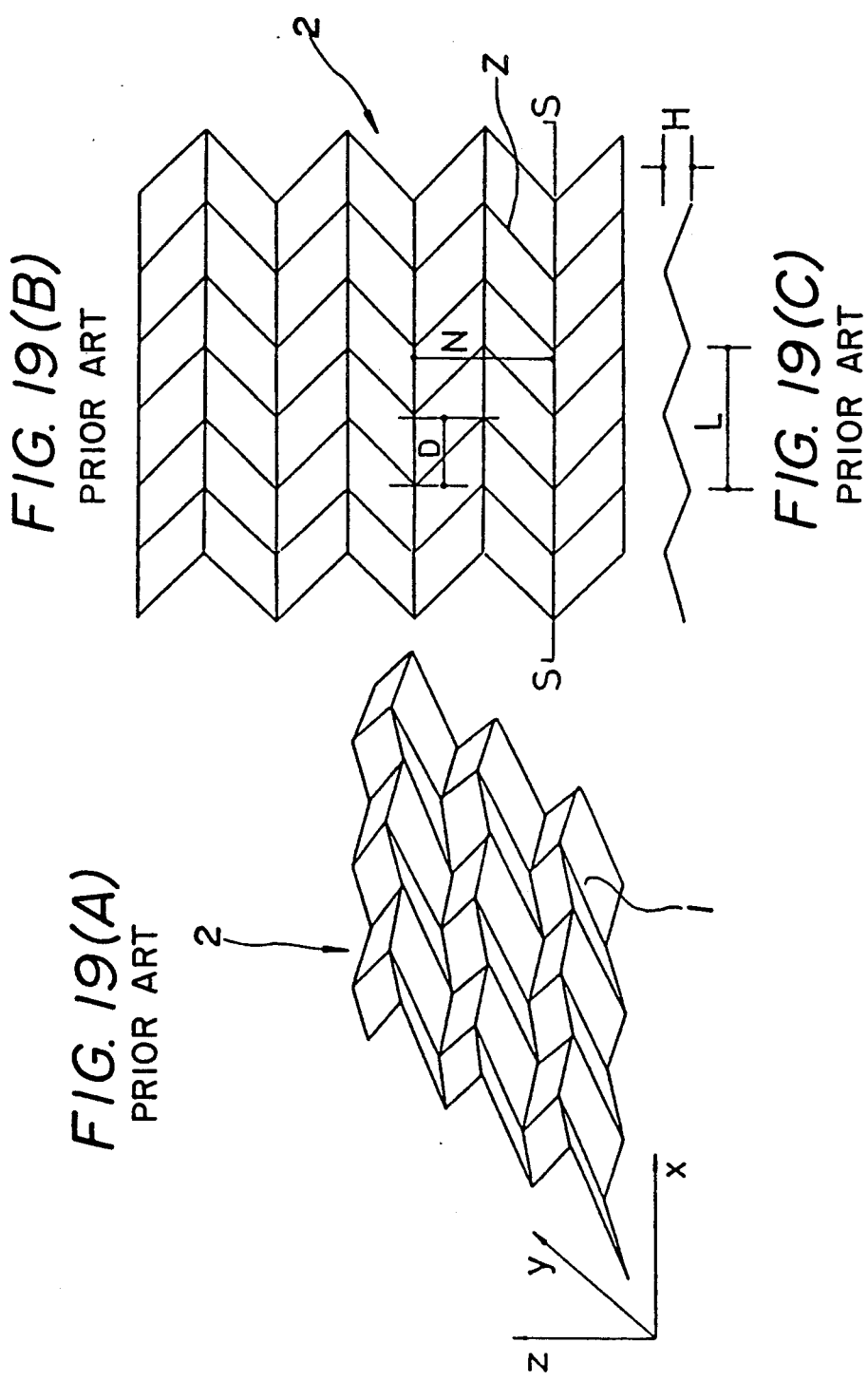

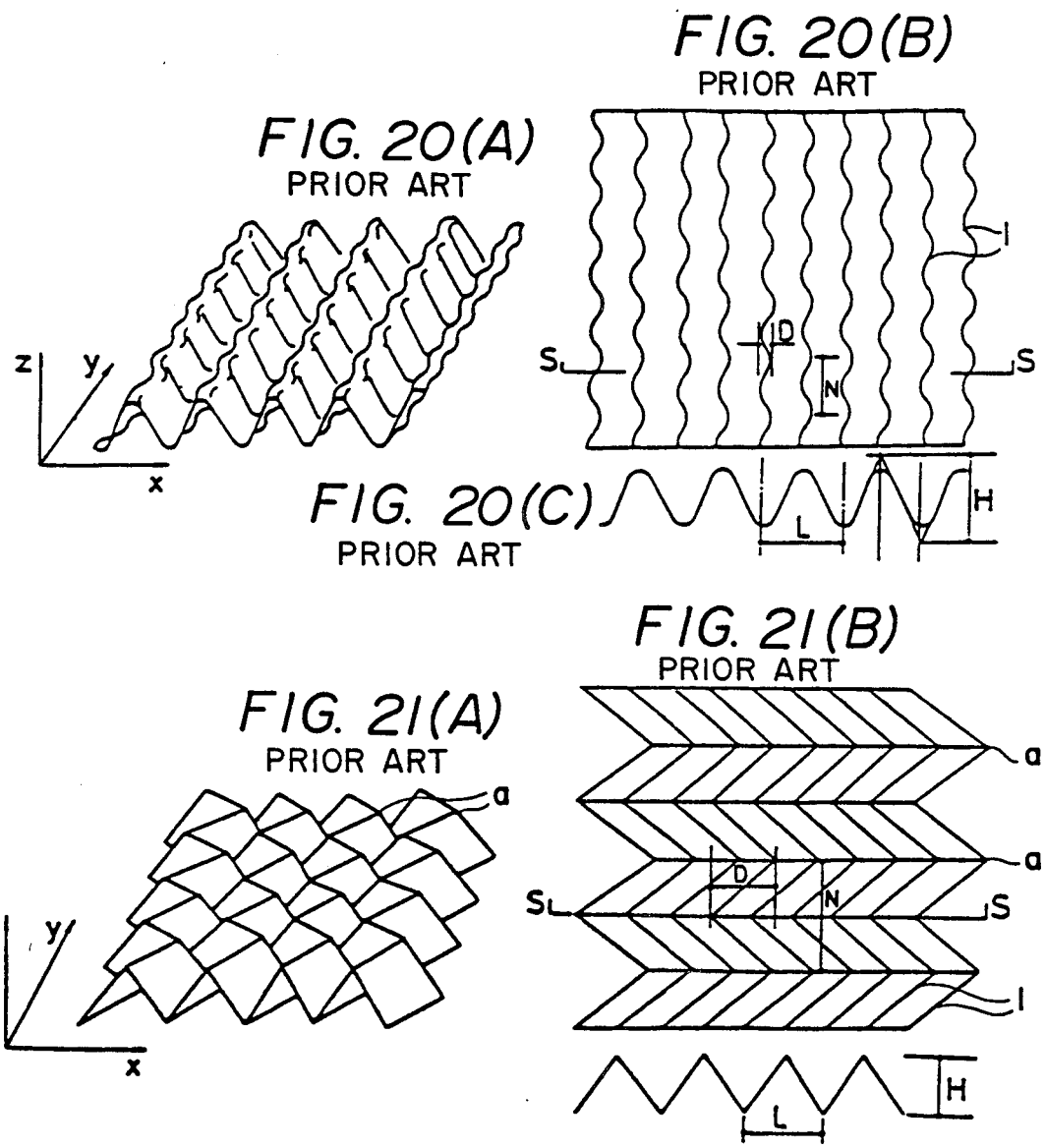

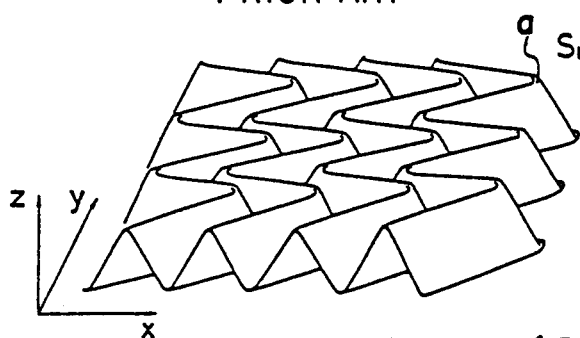
FIG. 22(A) PRIOR ART
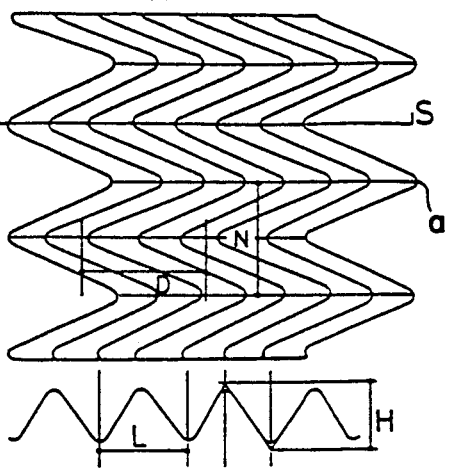
FIG. 22(B) PRIOR ART
FIG. 22(C) PRIOR ART
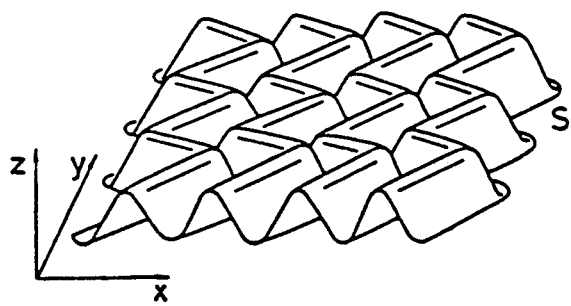
FIG. 23(A) PRIOR ART
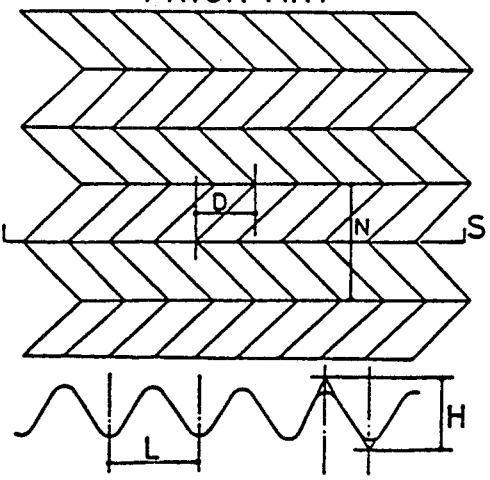
FIG. 23(B) PRIOR ART
FIG. 23(C) PRIOR ART FIG. 24(A) PRIOR ART
FIG. 24(B) PRIOR ART
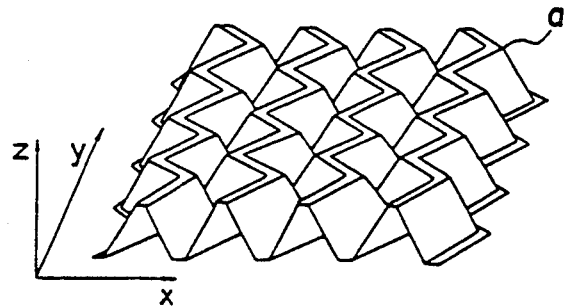
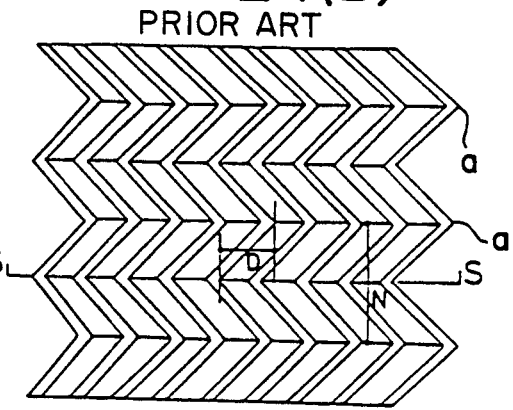
FIG. 24(C) PRIOR ART
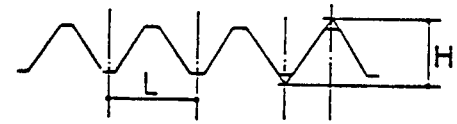
FIG. 25(A) PRIOR ART
FIG. 25(B) PRIOR ART
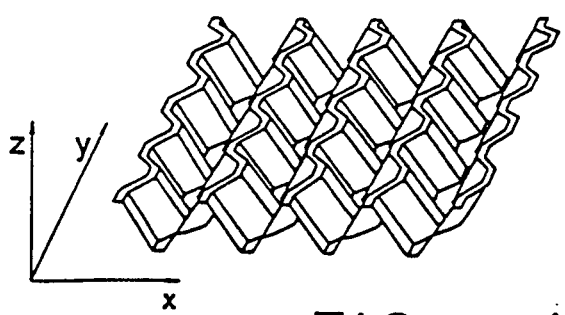
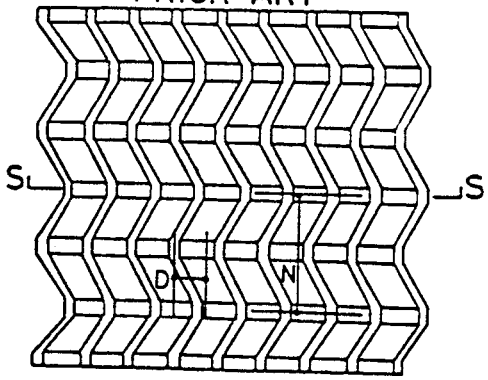
FIG. 25(C) PRIOR ART

REINFORCED COMPOSITE CORRUGATE BODY

This application is a continuation of now abandoned application, Ser. No. 07/613,536 filed on Nov. 6, 1990.

BACKGROUND OF THE INVENTION

This invention relates to a composite corrugated body wherein vertically extending ridges and grooves are formed alternately in a sheet material to form corrugate lines that meander in a plane to form a corrugated body and wherein a flat liner is adhered to at least one of the opposite faces of the corrugated body.

PRIOR ART

Various sandwiched materials such as corrugated board and honeycomb board are well known, and one corrugate board that actually has been put into products includes a corrugated body having straight corrugate lines and having a flat sheet adhered to at least one of the opposite faces thereof. In recent years, however, various modifications and improvements have been made to such corrugated body, and there are available many publications of investigations of corrugated bodies which have meandering corrugate lines as hereinafter described.

The inventor has made several investigations and experiments, and it has been found that, in order to put such corrugated body into practical use, it must have at least the following structural features:

(1) As compared with an existing composite corrugated body wherein two flat sheets are applied to the opposite faces of a corrugated body having straight corrugate lines, as is represented by the structure of an ordinary corrugated board, a composite corrugated body which includes two flat sheets of a similar material and having an equal thickness, the amount of material of the corrugated body is equal to or increased by 10%, and the structural strength improved by more than 15%.

(2) A corrugated body can be formed at a working speed higher than 50 meters per minute by a roll forming operation which assures a quality normally maintaining a stable shape and material strength.

(3) Consequently, the effect with respect to expense, that is, the structural strength/cost of product, is higher by at least 10%, and preferably by 30% or more, than that of the existing composite corrugated body.

Structural strength that a composite corrugated body should have will be described subsequently. In a composite corrugated body 4 as shown in FIGS. 17(A)-17(D), wherein a corrugated body 2 having meandering corrugate lines 1 and flat sheets 3 are integrated with each other:

Profile Requirement A-1

It is essential that the flat crushing or shearing rigidity in the x direction in the z-x plane is sufficiently high, and to this end, it is required that a substantial amplitude ratio H/L of the profile of the corrugate lines 1 should be higher than 0.4 (refer to FIG. 17(A)).

The substantial amplitude ratio H/L is a ratio between an amplitude H and a wavelength L of a sectional wave defined when the corrugate lines 1 are cut along the x-z plane, i.e. a vertical plane in the x direction in FIG. 17(A).

Profile Requirement A-2

It is essential that the bending rigidity of the composite corrugated body, when supported at opposite sides along the y direction and subjected to vertical force F, be sufficiently high, and to this end, it is required that a substantial meandering overlapping ratio D/L of the profile of a corrugate line 1 should be higher than 0.5 (refer to FIG. 17(B)). Here, the substantial meandering overlapping ratio D/L is a ratio between an amplitude D of meander of a corrugate line when the corrugate line 1 is viewed in the x-y plane, and wavelength L.

Profile Requirement A-3

It is essential that the compression rigidity in the x-y plane is sufficiently high, and to this end, it is desired that a width w of joining between the corrugated body 2 and the flat sheets 3 when they are adhered to each other should be as great as possible (refer to FIG. 17(C)).

Among the three requirements described above, the requirements A-1 and A-2 should be provided at the same time, and if one of the requirements is not satisfied, the required mechanical strength will not be achieved.

The workability that a composite corrugated body should have now will be described. When a work sheet is roll formed at a high speed by a corrugator, it is first necessary for a stretch strain ratio to be restricted to lower than 5% adjacent crest and bottom portions of the corrugate lines 1. Further, it is essential that no tearing damage should take place at or around neutral axes of the corrugate lines 1, and also that no excess wrinkles should appear at or around center axes of the grooves of the corrugate lines 1 (refer to FIG. 17(D)). To this end:

Profile Requirement B-1

Such values of a substantial meandering ratio D/N as well as the substantial amplitude ratio H/L of the profile of the corrugate lines 1 as will make a width narrowing ratio i in the direction of the corrugate lines 1 lower than 10% should be selected. Here, the substantial meandering ratio D/N is a ratio between the amplitude D and a wavelength N of each corrugate line 1 is viewed in the x-y plane. A width narrowing ratio i increases when the ratio D/N increases.

Profile Requirement B-2

Sections at crest and bottom portions of the corrugate lines 1 should be formed such that they may be curved or chamfered over a relatively small width.

Profile Requirement B-3

The meandering pattern of the corrugate lines 1 in a plane should be a smooth waveform pattern, and particularly bent portions of the corrugate lines in a plane around center axes of the ridges and grooves should be curved or chamfered with a rather large width.

The profile requirements B-1 and B-2 described above should be satisfied at the same time, and if the profile requirement B-3 is satisfied in addition to such two requirements, workability is improved further.

For such a point of view, description will be made individually concerning the reasons why conventional examples shown in FIGS. 18 to 26 have not been put into practical use in a mass production system employing forming rollers (which will be described hereinafter) because they lack one or more of the decisive profile requirements discovered by the inventor and described above.

As shown in FIGS. 18 to 20, a corrugated body 2 of conventional type is a single body and is to be employed as a cushioning material for glass vessels. However, such conventional type is unsuitable as a composite corrugated body integrated with a flat sheet, and in fact, such a product cannot be found in industry. This is because, as is apparent from the corrugated bodies 2 of first and second conventional examples shown in FIGS. 18(A)–18(C) and 19(A)–19(C), the substantial amplitude ratios of sectional profiles of the corrugate lines 1 in the z-x plane are $H/L \approx 0.15$ and $H/L \approx 0.18$, respectively. Accordingly, even if composite corrugated bodies integrated with flat sheets are produced, the shearing rigidities in the x direction in the z-x plane will be extremely low and will be very far from a structural strength of existing corrugated board.

In the corrugated body 2 of the third conventional example shown in FIGS. 20(A)–20(C), since the substantial meandering overlapping ratio of the corrugate lines 1 is $D/L \approx 0.17$ and very low, even if a composite corrugated body wherein body 2 is integrated with flat sheets is produced, the bending rigidity of such a composite corrugated body when subjected to vertical force F as discussed regarding FIG. 17(B) will not provide a great difference from that of an existing corrugated board.

A characteristic of the first to third conventional examples is that the corrugated bodies 2 themselves are mass produced on an industrial scale by roll forming and are used as cushioning materials. In the first and second conventional examples, $H/L$ and $D/N$ are selected so that the width narrowing ratio i in the axial direction of the corrugate lines 1 is $i < 5\%$, and in the third conventional example, the width narrowing ratio i is $i > 10\%$. Roll forming is made possible only by using a work sheet having a very high stretch performance (a stretch ratio of 5 to 7% or so). Such work sheets have a serious defect that they cannot be put into practical use because composite corrugated bodies wherein such work sheets are integrated with flat sheets have low structural strength.

Fourth to ninth conventional examples illustrated in FIGS. 21 to 26 are characterized in that, while the first to third conventional examples have comparatively shallow and small corrugate lines formed therein, the fourth to ninth conventional examples have comparatively deep and large corrugate lines 1 formed therein.

More particularly, since the substantial amplitude ratio $H/L$ of the corrugate lines 1 of the fourth conventional example in FIGS. 21(A)–21(C) is 0.7 and the substantial meandering overlapping ratio $D/L$ is 0.8, the structural strength of a composite corrugated body obtained by integration of the same with flat sheets is very high in principle. However, on the other hand, since the substantial meandering ratio $D/N$ is 0.6 or so and very high, the width narrowing ratio i is higher than 23%, and roll forming is impossible in fact. Thus, while the strength is sufficiently high, the fourth conventional example cannot be put into practical use. Further, since bent portions of a meandering pattern in a plane of the corrugate lines 1 at center axes of the ridges and grooves thereof project in acute angles, breaking still may occur at projection portions a of a work sheet (a sheet in which corrugate lines are to be formed) during roll forming. Also, since the sectional shapes of the crest and bottom portions of the corrugate lines 1 are bent sharply, portions thereof jointed with flat sheets form very weak joints, and accordingly, it can be said that a sufficient joining strength cannot be provided and thus actual structural strength is not very high.

The fifth conventional example in FIGS. 22(A)–22(C) is formed in a deeper configuration than the fourth conventional example. Accordingly, it is further improved in structural strength, but the workability is further deteriorated. While the substantial amplitude ratio and the substantial meandering overlapping ratio representing strength are $H/L \approx 0.8$ and $D/L \approx 1.3$, respectively, and sufficiently high, since the width narrowing ratio representing workability is $i > 30\%$ and very high, it can be seen that formation by a roll forming operation is almost impossible. However, since the bent portions a at the central axes of the ridges and grooves of the corrugate lines 1 form curved projections, there is an advantage that tearing and stretching distortion of a work sheet is moderated slightly during roll forming.

The sixth conventional example in FIGS. 23(A)–23(C) is formed to have substantial amplitude ratio $H/L$ and substantial meandering overlapping ratio $D/L$ values similar to those of the fourth conventional example and is sufficiently high in structural strength. Further, since sections of the crest and bottom portions of the corrugate lines 1 are formed to have a rather large curved shape, joining areas of flat sheets are increased and the structural strength is improved. However, since the substantial amplitude ratio and substantial meandering ratio are $H/L \approx 1.0$ and $D/H \approx 0.5$, respectively, and high, the width narrowing ratio is $i > 25\%$ and inevitably very high. As a result, it is apparent that roll forming is impossible.

The seventh conventional example in FIGS. 24(A)–24(C) is characterized in that the crest and bottom portions of the corrugate lines 1 have a trapezoidal shape that is very convenient for joining to the flat sheets. Further, since the substantial amplitude ratio of the corrugate lines 1 is $H/L \approx 0.8$ and high, shearing rigidity is high, and since the substantial meandering overlapping ratio is $D/L \approx 0.7$ and high, bending rigidity is increased. Consequently, the total structural strength is improved. However, since the width narrowing ratio when $H/L \approx 0.8$ and $D/N \approx 0.5$ is $i > 25\%$ and very high, roll forming is quite impossible. Further, acute projections a are present around the center axes of the ridges and grooves in a meandering pattern of the corrugate lines 1 as viewed in the x-y plane, and upon roll forming, a work sheet is subjected to sudden pressurization and deformation by such projections a, thus yielding excessive stretching distortion and finally producing tearing damage. Further, while the trapezoidal shape of the crest and bottom portions form wide flat faces, strong stretching distortion involved in a width narrowing process is produced in the flat faces around the projections a, and as a result, stable formation is difficult.

The eighth conventional example in FIGS. 25(A)–25(C) is an improvement of the seventh conventional example and is characterized in that portions of the corrugate lines 1 around the center axes of the ridges and grooves in a meandering pattern as viewed in the x-y plane are bent in a trapezoidal shape. Since the substantial amplitude ratio of the corrugate lines 1 is $H/L \approx 0.8$ and high, the shearing rigidity is sufficiently high. However, since the substantial meandering overlapping ratio is D/L≈0.3 and low, the bending rigidity is very low. As a result, the structural strength is not improved very much compared with that of the shape of an existing corrugated board or the like. Further, since the substantial amplitude ratio and substantial meandering ratio are H/L≈0.8 and D/N≈0.3, respectively, the width narrowing ratio i is i≈14% and high and roll forming is difficult. In addition, since pairs of non-sharp projections of the corrugate lines 1 are formed around the center axes of the ridges and grooves in a meandering pattern as viewed in the x-y plane, the work sheet is locally pressurized upon roll forming. This causes remarkable stretching distortion to be produced around the trapezoidal crest and bottom portions, similar to the seventh conventional example, and this makes stable working impossible.

The ninth conventional example in FIGS. 26(A)-26(C) is a further improvement of the eighth conventional example, but since the substantial amplitude ratio H/L and substantial meandering overlapping ratio D/L of the corrugate lines 1 are equal to those of the eighth conventional example, the structural strength is insufficient. Further, since the substantial meandering ratio D/N is substantially equal to that of the eighth conventional example, the width narrowing ratio is i≈14% and high and roll forming is difficult. In addition, since the crest and bottom portions of the corrugate lines 1 have trapezoidal flat faces, problems which take place upon roll forming are similar to those of the seventh and eighth conventional examples. However, since no projections are present at bent portions of the corrugate lines 1 in a meandering pattern as viewed in the x-y plane, this example is effective to restrict occurrences of stretching distortion or tearing damage of a work sheet slightly compared with the seventh or eighth conventional examples. However, the extreme difficulty in roll forming is a decisive reason preventing practical use.

For the reasons described above, none of the corrugated bodies of such various profiles have been put into practical use, except for utilization thereof by themselves as cushioning materials, in various applications of mass consumption, for example, such as a composite corrugated body which is obtained by integration of a corrugated body and flat sheets with each other for use as a corrugated board which is inexpensive and has a high structural strength. Further, there is no previous instance of mass production other than those described above.

Accordingly, the inventor has invented a reinforced composite corrugated body which was disclosed in Japanese Patent Laid-Open No. 8031/1989 in order to solve the problems of the prior art. Indeed, such reinforced composite corrugated body has achieved improvements in structural strength and workability compared with the prior art corrugated bodies described above. However, subsequent investigations and experiments have revealed that it does not sufficiently meet the contradictory requirements of the structural strength and workability. Consequently, reinforced composite corrugated bodies which are effective as a material for wide applications and mass production still have not been provided.

SUMMARY OF THE INVENTION

The object of the present invention is to provide a reinforced composite corrugated body which has improved structural strength against various mechanical external forces and which has such workability to enable stable and high speed roll forming.

In order to achieve such object, according to the present invention, there is provided a reinforced composite corrugated body, constituted such that corrugate lines provided by vertically extending ridges and grooves formed alternately in a sheet material are formed in a meandering waveform in a horizontal direction such that they have a substantial amplitude ratio H/L higher than 0.4 but lower than 1.4, a substantial meandering ratio D/N lower than 0.35, a substantial meandering overlapping ratio D/L higher than 0.5, a width narrowing ratio i in their advancing direction lower than 8% plus a stretch strain ratio of the sheet material. Sectional shapes of crest and bottom portions of the corrugate lines are curved or chamfered with a small width, to thus form a corrugate body, and a flat liner is adhered to at least one of the opposite faces of such corrugated body.

As a result, the reinforced composite corrugated body of the present invention will have remarkably improved structural strength with the same sheet material and same plate thickness, compared with existing corrugated board, and at the same time will enable roll forming at a high working speed without causing damage due to tearing or excess wrinkling. Thus, structural strength/cost of the product, that is, the value of the product compared with that of an existing corrugated board or the like, is remarkably improved.

The above and other objects, features and advantages of the present invention will become apparent from the following description of embodiments described in detail hereinbelow with reference to the accompanying drawings.

BRIEF DESCRIPTION OF THE DRAWINGS

FIG. 3(A) is a plan view of a composite corrugated body of the present invention;

FIG. 3(B) is a waveform diagram as viewed in the x-y plane showing edges of a meandering pattern of corrugate lines;

FIG. 5 is a graph of profile-shearing strength curves illustrating a relation between a maximum shearing stress index number in the x direction in the z-x plane and a gradient $\theta$ of inclined wall faces of corrugate lines and a substantial amplitude ratio H/L of corrugate lines in a composite corrugated body;

FIG. 12 is a perspective view showing an example of corrugate lines which satisfies a second production requirement;

FIGS. 15(A)-15(D) are views showing a further modification of the present invention;

FIG. 16 is a graph of profile curves showing a relationship among a substantial amplitude ratio H/L, a substantial meandering ratio D/N and a y direction width narrowing ratio i of corrugate liens of a composite corrugated body according to the present invention;

FIGS. 17(A)-17(D) are views showing an example of a conventional corrugated body;

FIGS. 18(A)-18(C) are perspective, plane and end views showing a corrugated body of a first conventional example;

FIGS. 19(A)-19(C) are similar views showing a corrugated body of a second conventional example;

FIGS. 20(A)-20(C) are similar views showing a corrugated body of a third conventional example;

FIGS. 21(A)-21(C) are similar views showing a corrugated body of a fourth conventional example;

FIGS. 22(A)-22(C) are similar views showing a corrugated body of a fifth conventional example;

FIGS. 23(A)-23(C) are similar views showing a corrugated body of a sixth conventional example;

FIGS. 24(A)-24(C) are similar views showing a corrugated body of a seventh conventional example;

FIGS. 25(A)-25(C) are similar views showing a corrugated body of a eighth conventional example.

DETAILED DESCRIPTION OF THE INVENTION

In the following, preferred embodiments of the present invention will be described with reference to the accompanying drawings.

Figure 1:
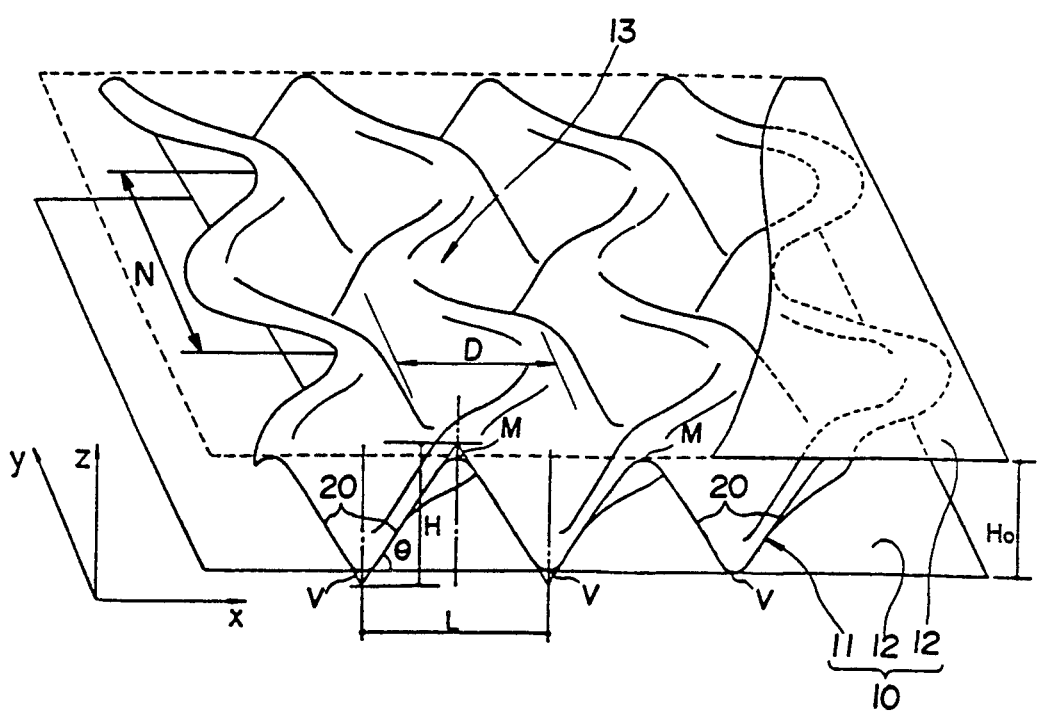
FIG. 1 is a partial perspective view of a composite corrugated body according to the present invention, with a flat liner material thereof shown partly broken away.

FIG. 1 shows an example of a reinforced composite corrugated body 10 to be used as a wrap around case according to the present invention. Body 10 includes a corrugated body 11 and flat liners 12. The corrugated body 11 has ridges M and grooves V located in planes spaced vertically in a z direction, and arranged alternately in an x direction to form corrugate lines 13. The corrugate lines 13 are meandered in a waveform in a y direction in an x-y plane such that they extend parallel to each other. The flat liners 12 are adhered integrally to the corrugate lines 13 at the ridges M and grooves V.

The profile of the corrugate lines 13 of the corrugated body 11 described above is determined taking into consideration facility of production (workability) in order to assure a desired strength and achieve practical use of the corrugated body 11.

Figure 2:
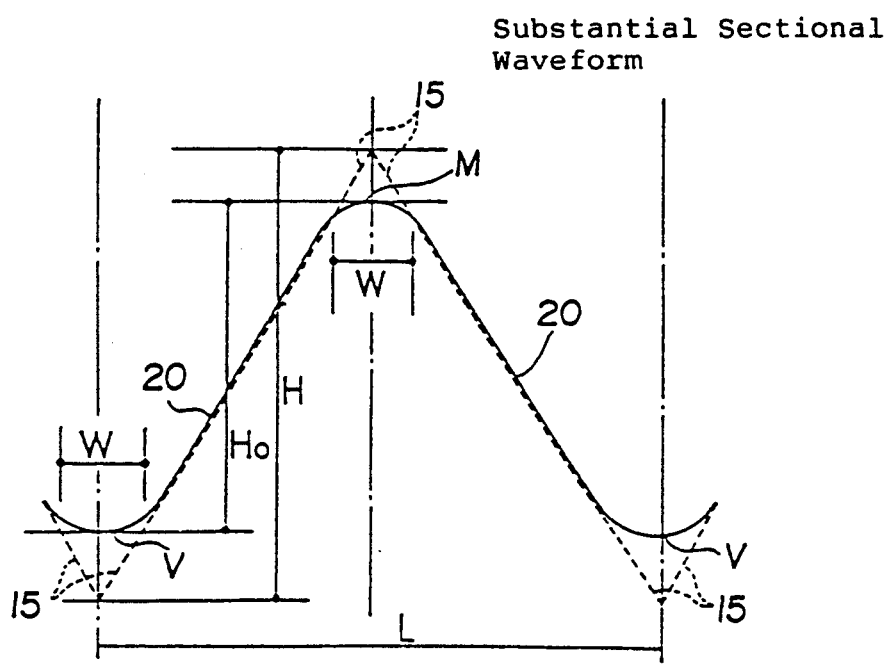
FIG. 2 is a sectional view showing the shape of the composite corrugated body of FIG. 1 as viewed in the z-x plane through corrugate lines thereof.

Before the above strength and workability are considered and described, a detailed description first will be given of a substantial amplitude ratio H/L, a substantial meandering overlapping ratio D/L and a substantial meandering ratio D/N (described above briefly in the discussion of the prior art) which will provide a standard of performance of the corrugated body and of the reinforced composite corrugated body. The substantial amplitude ratio H/L represents a relationship between an amplitude H and a wavelength L of a sectional wave formed by cutting the corrugate lines 13 along the z-x vertical plane in FIG. 1 and is determined, more particularly, in the following manner. Thus, there is determined a substantial amplitude H of a substantial sectional waveform 15 (see FIG. 2) which is obtained by linearly extending slopes of opposite inclined wall portions 20 of a sectional waveform of corrugate line 13 in both upward and downward directions. The substantial amplitude ratio H/L is the ratio of the substantial amplitude H to a period L of the sectional waveform.

The substantial meandering ratio D/N represents a relationship between an amplitude D and a wavelength N when each corrugate line is viewed in the x-y plane. Particularly, the substantial meandering ratio D/N is determined in the following manner. With reference to FIGS. 3(A) and 3(B), a reference meandering pattern 17 is obtained by extending linearly in the opposite directions slopes of portions around each neutral axis of a waveform of a corrugate line 13 as viewed in the x-y plane. A meandering pattern 16 has an amplitude $D_0$. The reference meandering pattern 17 has an amplitude $D'$. A substantial meandering pattern 18 has a substantial amplitude D determined as $D = D_0 + (D' - D_0) \times k$ (where $k \approx 0.3$). The substantial meandering ratio D/N is the ratio of the substantial amplitude D to the meandering pattern period N.

Further, the substantial meandering overlapping ratio D/L represents, as shown in FIG. a relationship of the amplitude D of each corrugate line and the wavelength L of the sectional wave when the corrugate lines are viewed in the z-x plane.

The following profile requirements A-1, A-2 and A-3 which are necessary for structural strength are described below with regard to bases, origins, actions and effects thereof.

Profile Requirement A-1

Figure 4:
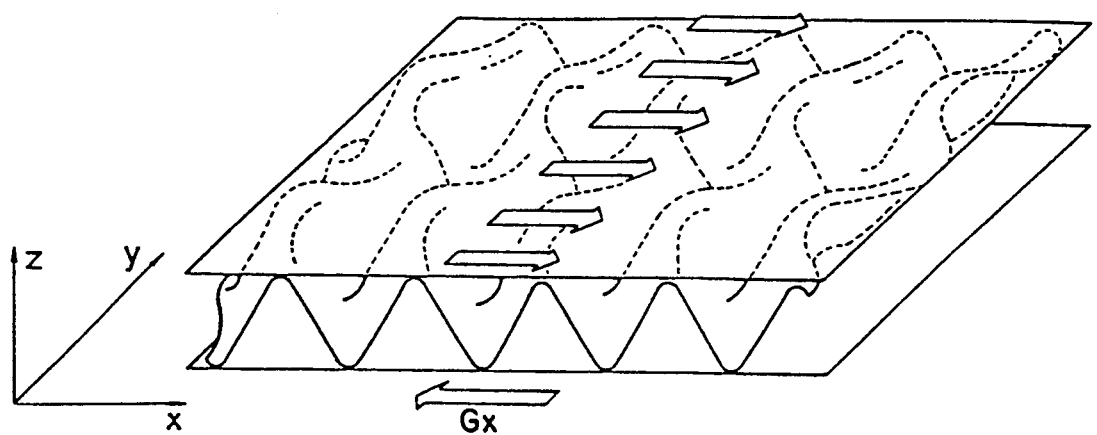
FIG. 4 is a perspective view schematically showing a direction of shearing stress in a composite corrugated body of the present invention.

Using as a variable an inclination gradient of $\theta$ of an inclined wall portion 20 of a corrugate line 13 with respect to a flat liner 12, that is the substantial amplitude ratio H/L of a sectional waveform of a corrugate line 13, a variation in value of a shearing stress Gx (refer to FIG. 4) in the x direction in the x-y plane relative to variation of such variable is confirmed by experiments, the results of which are illustrated in the graph of FIG. 5 showing a set of profile-shearing strength curves. Here, the functional expression of the curve set is represented as $Gx - g_j(H/L)$, where Gx is a maximum shearing stress index number in the x direction, g is a functional symbol, and j is a parameter equal to the substantial meandering ratio D/N of a waveform of a corrugate line 13 as viewed in the x-y plane.

As can be seen from FIG. 5, the individual curves vary such that, as the substantial meandering ratio j increases in value from 0 to 0.5, the curves gradually and successively are shifted upwardly in a similar manner to parallel movement, while gradually the distance between the curves decreases. Most characteristic is that each of the curves rises in a comparatively steep gradient until the shearing stress exceeds $Gx=1.0$, while the inclination angle varies from $\theta=10°$ (H/L $\approx 0.1$) to $\theta=40°$ (H/L$\approx 0.4$), and at approximately $\theta=45°$ (H/L $=0.5$). Thereafter, the gradient is moderated slightly, and then a summit finally is reached at approximately $\theta \approx 55°$ (H/L $\approx 0.7$). Each curve then drops in a comparatively steep gradient to approximately $\theta \approx 70°$ (H/L $=0.4$). After $\theta \approx 70°$ the gradient is moderated slightly until $\theta \approx 90°$ is reached. In particular, the characteristic of each curve is that a common peak effect appears at approximately $\theta \approx 55°$ (H/L$=0.7$).

In other words, judging from the results described above, the inclination angle $\theta$ at which a predetermined shearing strength Gx which can be effective for practical use can be obtained is $40° \leq \theta \leq 70°$, preferably 55°. In terms of the substantial amplitude ratio H/L, then it is possible to approximately limit $0.4 \leq H/L \leq 1.4$ as an appropriate substantial amplitude ratio (hatched area in FIG. 5).

It is to be noted that $Gx=1.0$ is a maximum shearing stress in the x direction at $j=0$, that is, at a peak which can be seen with composite corrugated body such as an existing corrugated board.

Profile Requirement A-2

Figure 6:
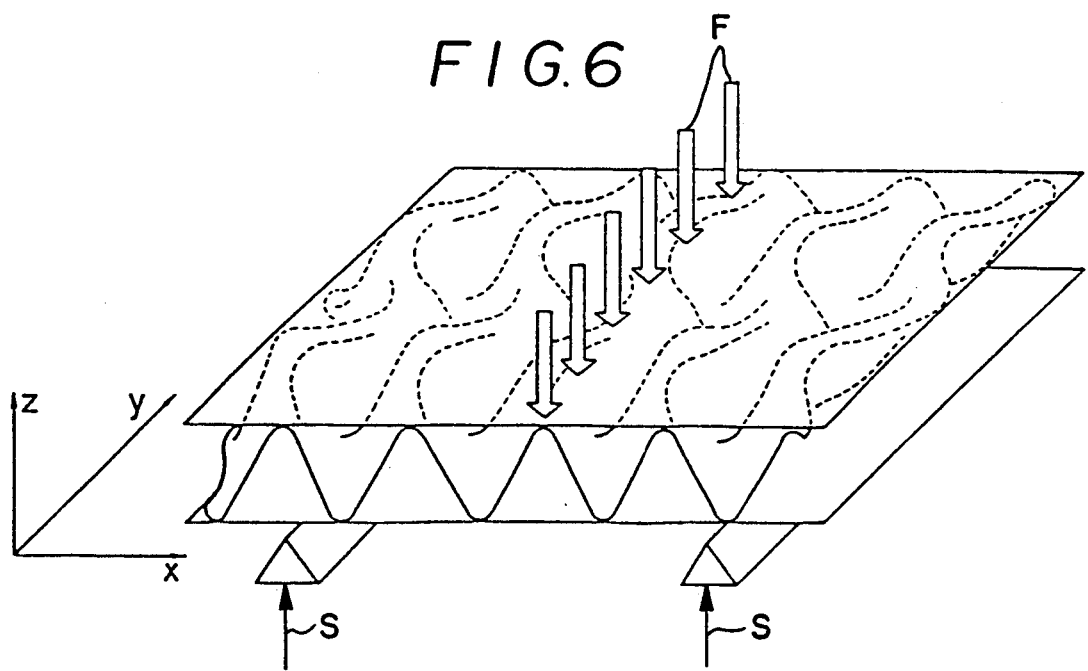
FIG. 6 is a perspective view schematically showing a direction of bending stress in a composite corrugated body.

A factor which assures practical use of structural strength of a reinforced composite corrugated body is out-of-plane bending rigidity in a direction perpendicular to a corrugate line, i.e. rigidity against force F in FIG. 6, with countering support forces S along opposite sides in the y direction in addition to shearing stress strength as described above.

Figure 7:
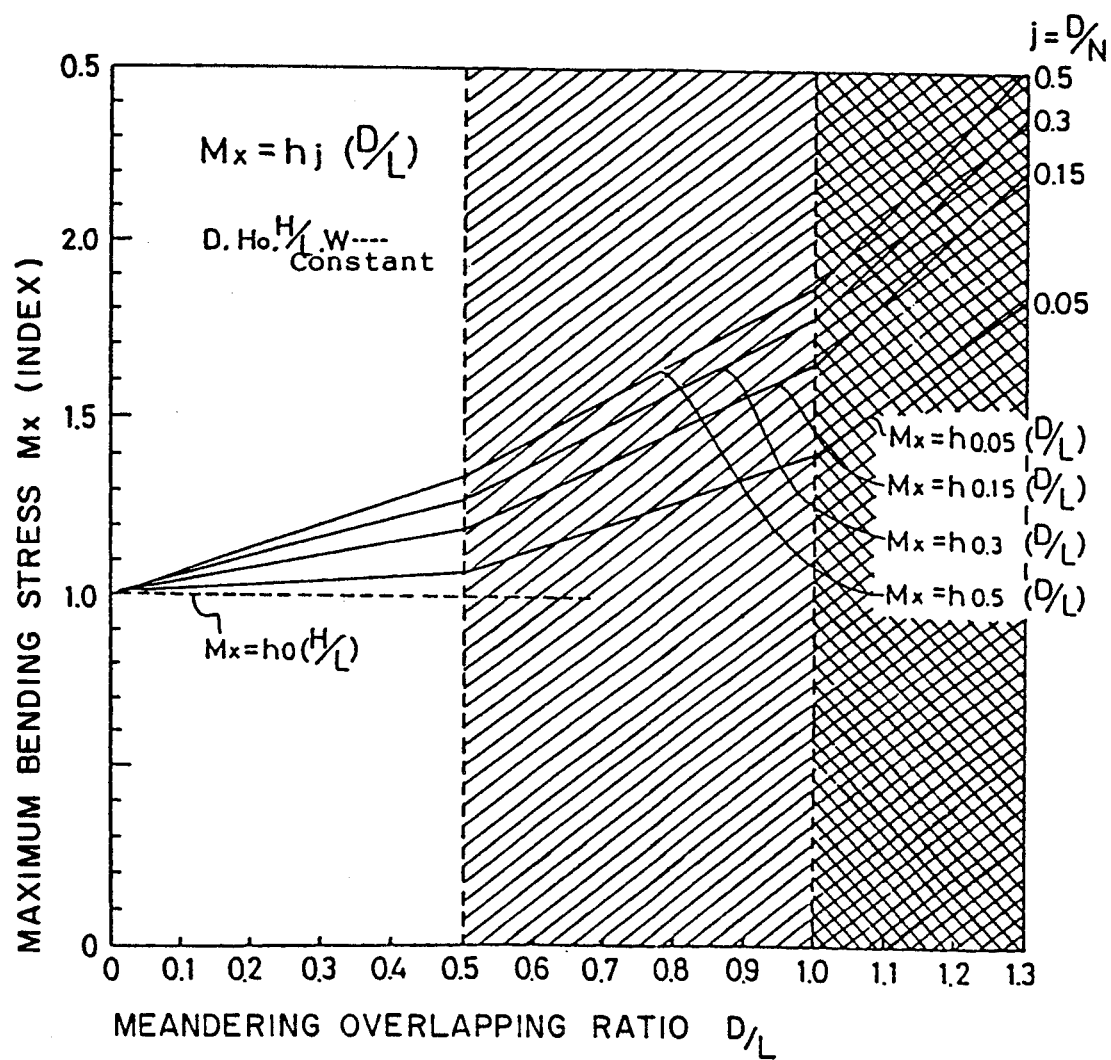
FIG. 7 is a graph of profile-bending strength curves illustrating a relationship between a maximum bending stress index number and a substantial meandering overlapping ratio D/L as well as a substantial meandering ratio D/N of corrugate lines in a composite corrugated body.

Using as a variable the ratio of the amplitude D of a corrugate line 13 in a waveform as viewed in the x-y plane to a period L of the sectional waveform of corrugate line 13, that is the substantial meandering overlapping ratio D/L, variations of values of the maximum bending stress (index number) relative to variations of such variable is confirmed by experiments, results of which are indicated as a set of profile-bending strength curves in FIG. 7.

The functional expression of the curve set is represented as $Mx=h_j(D/L)$, where Mx is a maximum bending stress index number, h is a functional symbol, and j is a parameter equal to the substantial meandering ratio D/N.

As is apparent from FIG. 7, the individual curves vary such that, as the value of the substantial meandering ratio j increases from 0 to 0.15, the curves gradually and successively are shifted upwardly while the gradients thereof change slightly and the distance between the curves gradually decreases. Most characteristic is that each of the curves rises in a low gradient while the substantial meandering overlapping ratio D/L varies from 0 to 0.5, but after D/L exceeds 0.5 each curve rises in a steeper gradient, and after D/L exceeds 1.0, the gradient of each curve further increases. In other words, each curve has specific D/L values which produce two bending points for the curve, and such values are common to the individual curves having different values of j. It is to be noted that $Mx=1.0$ is a bending stress which can be seen with a composite corrugated body having $j=0$, that is, a composite corrugated body like an existing corrugated board.

It has been made clear that each of the profile-bending stress curves $Mx=h_j(D/L)$ has two bending points where the substantial meandering overlapping ratio D/L is 0.5 and 1.0 as described above. However, variations of the D/L value are observed with regard to a mutual positional relationship of meandering patterns of the corrugate lines as viewed in planes parallel to the x-y plane.

With reference to FIG. 8(A), there is shown a meandering pattern in the y direction of a pair of adjacent ridges $M_1$, $M_2$ with a groove V therebetween and defining a meandering inclined wall portion 20a extending upwardly from groove V to ridge $M_1$ and an inclined wall portion 20b extending upwardly from groove V to ridge $M_2$. Center axes of bent portions of each ridge and groove extend in the x direction (see FIG. 3(B)). A plane $S_1$ parallel to the y-z plane defines a line in the y direction that connects all of the center axes of the bent portions m of ridge $M_1$ at points of contact thereof with an upper liner 12a (see FIG. 8(A1)). Similarly, a plane $S_2$ parallel to the y-z plane defines a line that connects all of the center axes of bent portions n of groove V that are between bent portions m in the y direction at points of contact thereof with a lower liner 12b (see FIG. 8(A2)). A plane $S_3$ is parallel to the y-z plane and bisects the meandering pattern at the center of groove V.

Figure 8C:
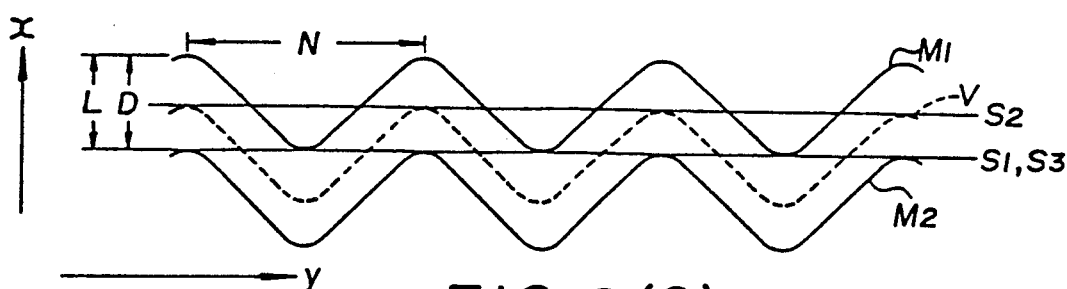
FIGS. 8(A)-8(D2) are schematic views illustrating positional relationships between corrugate lines at different meandering overlapping ratios thereof in composite corrugated bodies and positional relationships between the corrugate lines and flat liner material thereof.

As shown in FIG. 8(A), when $D/L<0.5$ plane $S_1$ is spaced away from plane $S_2$ in the x direction, with a gap between planes $S_1$ and $S_2$. As shown in FIG. 8(B), when $D/L=0.5$ planes $S_1$ and $S_2$ coincide. As shown in FIG. 8(C), when $D/L=1.0$ plane $S_1$ is shifted beyond plane $S_2$ and coincides with plane $S_3$. As shown in FIG. 8(D), when $D/L>1.0$ plane $S_1$ is further shifted beyond plane $S_3$.

Further, if variations of the positional relationship of the meandering patterns of the corrugate lines with respect to values of D/L described above are observed with regard to a sectional shape of the lines in the y direction of the reinforced composite corrugated body, then the reinforced composite corrugated body has a characteristic in profile of truss-like structure and variations of the out-of-plane bending strength Mx in the x direction of the reinforce composite corrugated body become more apparent.

Figure 8:
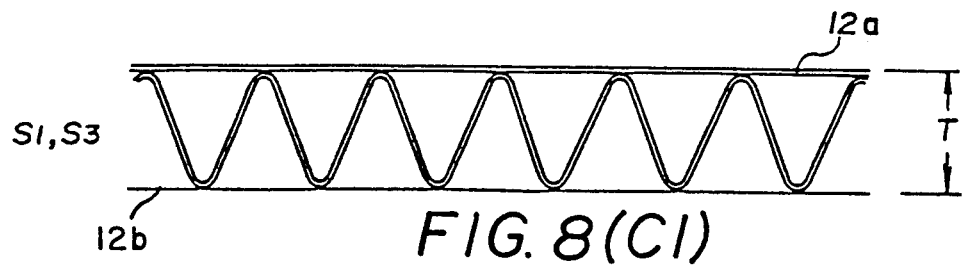
Figure 8:
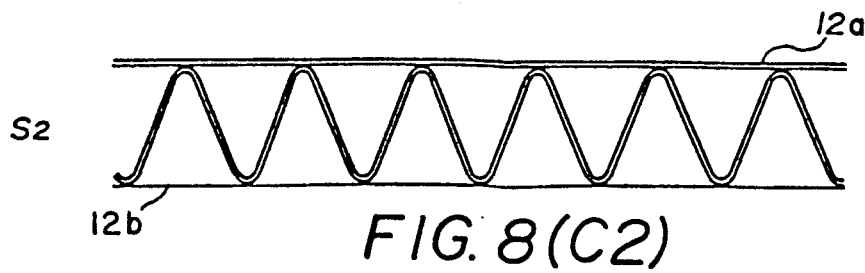
Figure 8D:
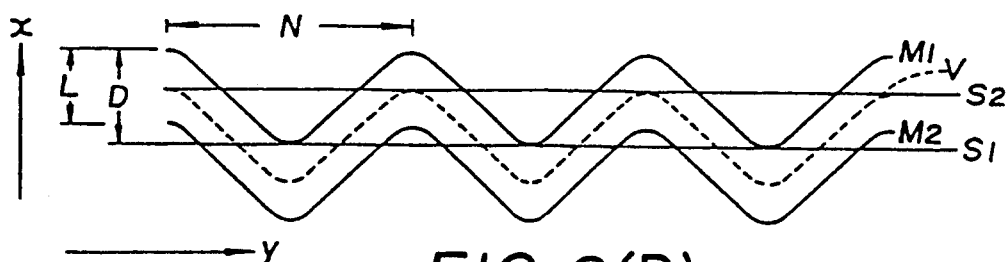
Figure 8:
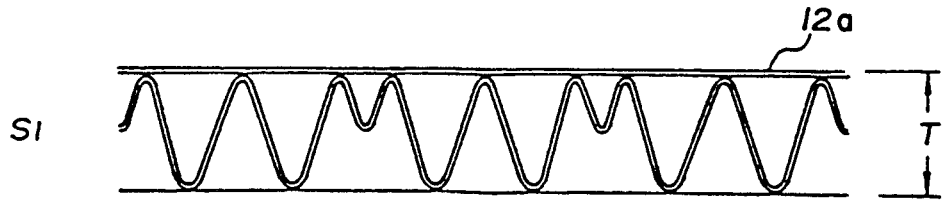
Figure 8:
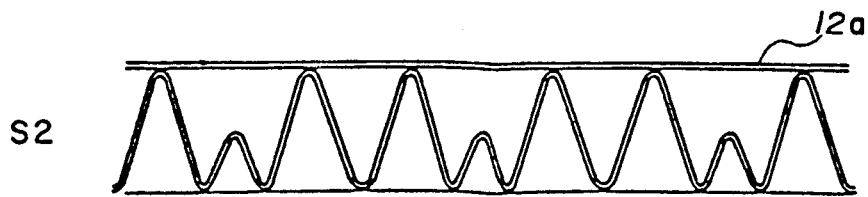
Figure 9A:
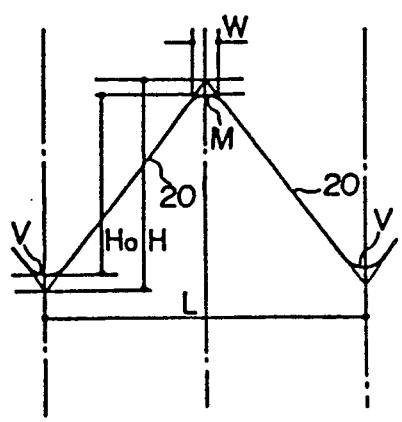
FIGS. 9(A)-9(B-3) are waveform diagrams in transverse section of a composite corrugated body in the z-x plane through the corrugate lines.
Figure 9B:
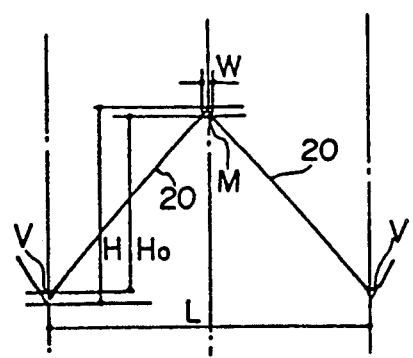
Figure 9C:
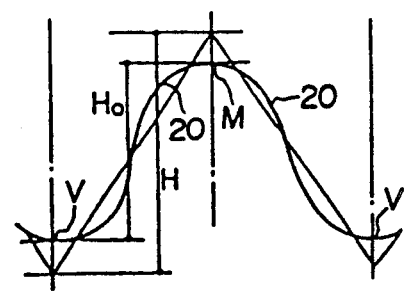
Figure 9D:
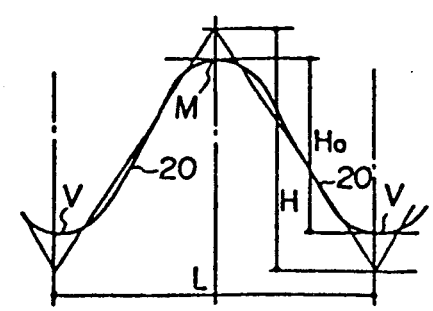

That is, when $D/L<0.5$ the reinforced corrugated body is joined at opposite sides thereof to respective flat liners 12a and 12b at different planes (see FIGS. 8(A1) and 8(A2)). Thus, the truss-like structure is slightly unstable, and consequently, the bending strength Mx is very low. When $D/L=0.5$, the reinforced corrugated body is joined in the same plane at the opposite upper and lower faces thereof to the respective liners (see FIG. 8(B1)). Thus, the characteristic in profile of the truss-like structure is quickly changed into a stable one compared with the truss-like structure described above. When $D/L>0.5$, as the value increases gradually, the inclination angle of a web (diagonal) of the truss-like structure becomes larger. Accordingly, the strength Mx is increased with respect to that when $D/L<0.5$. When $D/L=1.0$, density of joining between the reinforced corrugated body and the opposite liners is double that when $D/L=0.5$ (compare FIGS. 8(B1) and 8(C1)). Consequently, the characteristic in profile of the truss-like structure is changed suddenly into a further stabilized profile compared with that of the truss-like structure described above. When D/L>1.0, as the value increases gradually, the inclination angle of the web of the truss-like structure becomes further steep, and the vertical height of a triangle which is constituted by the web joined only to a flat liner on one face of the reinforced corrugated body and the flat liners is increased. Consequently, the strength Mx increases more rapidly than when D/L<1.0.

While it has been made clear that each of the profile-bending strength curves Mx=$h_j$(D/L) has two singular points at D/L=0.5 and D/L=1.0 at which the bending stress Mx increases suddenly as described above, in order to assure a bending stress Mx which is suitable to enable a reinforced composite corrugated body of the present invention to be put into practical use, the substantial meandering overlapping ratio D/L should be D/L>0.5, and such range is indicated as a hatched area and a meshed portion in FIG. 7. Then, more preferably, D/L should be D/L>1.0, and such range is indicated by the meshed portion in FIG. 7.

Profile Requirement A-3

In order to obtain a desired strength for the corrugate lines, it is necessary to satisfy a requirement described below in addition to the various requirements described above.

In particular, the various structural strengths that a reinforced composite corrugated body according to the present invention has can be obtained only by joining and integration of a reinforced corrugated body and flat liners. Above all, the shearing strength in the x direction and the bending strength out-of-plane are determined significantly by a joining area between the reinforced corrugated body and the flat liners. Where the joining method and the bonding agent are the same, such strengths increase in proportion to increasing the joining area.

Accordingly, the contact area therebetween should be made comparatively great. More particularly, as shown in FIG. 9, the reinforced corrugated body should be formed such that the sectional shapes of the crest and bottom portions of the corrugate lines are such that a bending width w of the crest and bottom portions is increased as much as possible.

Subsequently, requirements (profile requirements B-1 B-2 and B-3) necessary to produce a reinforced composite corrugated body which can be produced easily will be described one by one below in connection with bases, origins, actions and effects thereof.

Profile Requirement B-1

Figure 10:
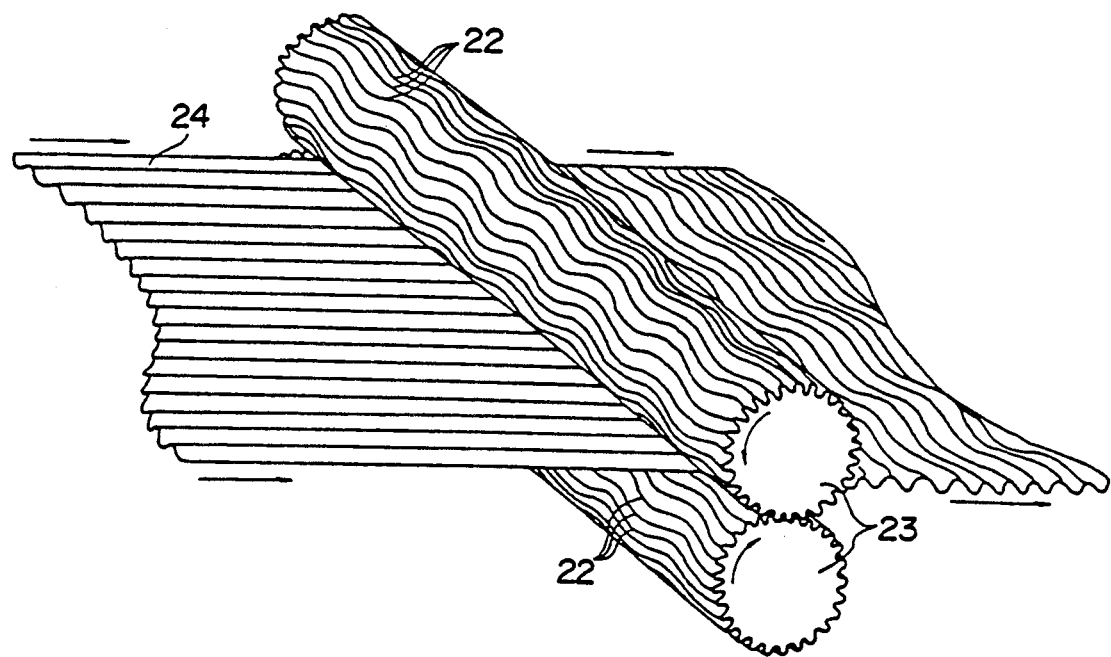
FIG. 10 is a broken perspective view schematically illustrating a roll forming method which is used to work and shape a reinforced corrugated body.

A procedure for producing a reinforced corrugated body first will be described. As shown in FIG. 10, a corrugated work sheet 24 which has been narrowed in width by a predetermined amount in advance is inserted between a pair of forming rollers 23 each of which has formed on a peripheral face thereof a large number of tooth-shaped ribs 22 spaced in a circumferential direction such that they substantially coincide with corrugate lines to be produced. Then, as the corrugated work sheet 24 is shaped under pressure between the two forming rollers 23, corrugate lines of a desired profile are produced (roll forming method). It is to be noted that predetermined width narrowing applied in advance to the corrugated work sheet 24 (width pre-narrowing ratio $i_0$) is set substantially equal to a final width narrowing ratio i (strictly, i≧$i_0$ because the width of the sheet further reduces upon working).

The width narrowing ratio i denotes a coefficient of contraction of the width of a sheet after formation therein of corrugate lines to the width of the sheet in the form of a flat sheet or plate before formation therein of the corrugate lines. If the width narrowing ratio i (pre-narrowing ratio $i_0$) is increased beyond a certain limit, excess wrinkling and breaking in the x direction frequently take place. This is because H/L of a sectional waveform of the corrugated body 11 becomes excessively high and irregular buckling deformation takes place locally in a sectional waveform which is pressurized directly after the corrugated boy 11 is supplied between the forming rollers 23. Consequently, collapse and accompanying crimping are caused, while at the same time the distribution of the width narrowing ratio i which is uniform in the lateral direction is prevented remarkably.

More particularly, if a limit to a predetermined width narrowing ratio i is described with reference to the graph in FIG. 11 which shows a relationship between the amount of occurrence of collapse and the width pre-narrowing ratio $i_0$, the predetermined narrowing ratio i required for the corrugated body 11 which is obtained by roll forming in the first place is given by i>$i_0$+β. Here, β is a lateral direction limit of stretch strain ratio of the corrugated work sheet 24 and is such a value that, if the limit is exceeded, the deterioration in material strength (a condition in which the strength is decreased by 30% of that in the initial state) is so remarkable that the corrugated work sheet 24 no longer can be used practically. In the case of a paper sheet, a steel sheet or a semi-rigid plastic sheet which has a low stretching limit, 2.0% is determined as the limit stretch strain ratio β, and in the case of an aluminum sheet or a plastic sheet, the stretching limit is rather high and accordingly 5.0% is determined as the limit stretch strain ratio β. It is to be noted that the collapse frequency index number in FIG. 11 is determined to be 1.0 where the width pre-narrowing ratio $i_0$=5.0%.

Figure 11:
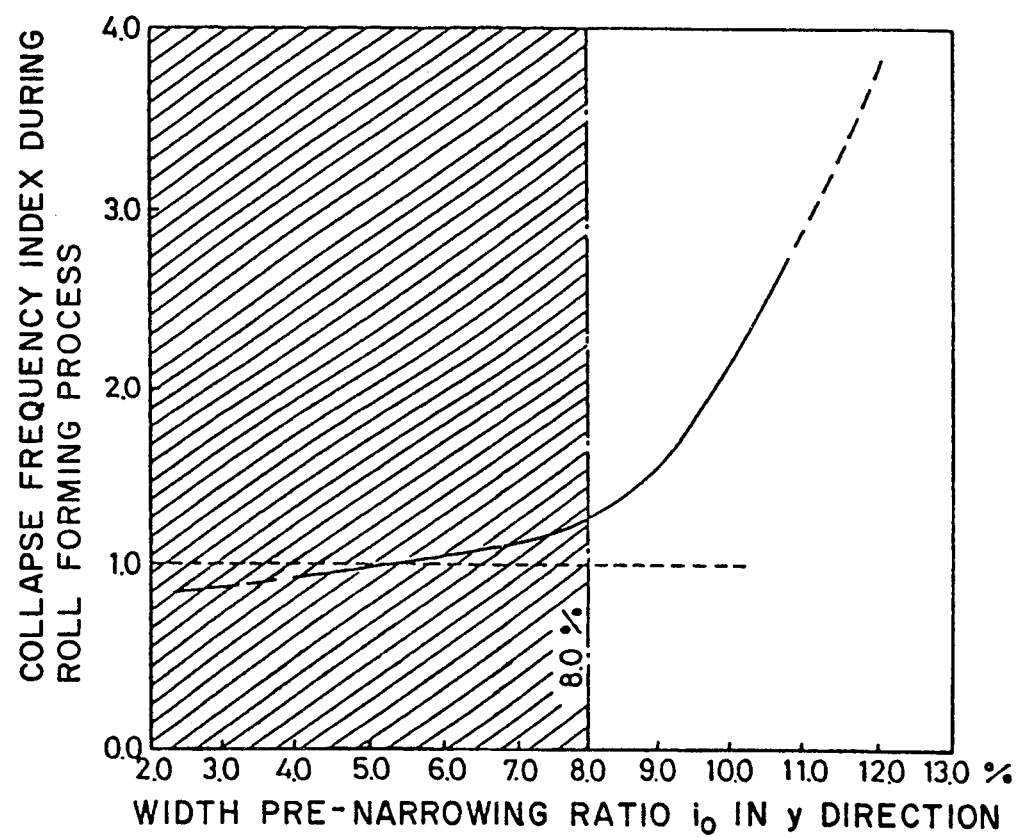
FIG. 11 is a graph showing a relationship between a collapse occurrence frequency index number and a width pre-narrowing ratio of a corrugated work sheet upon roll forming of a composite corrugated body.

As is apparent from FIG. 11, while the value of the collapse frequency increases together with a variation of the width pre-narrowing ratio $i_0$, such increase becomes radical after substantially $i_0$=8.0% is exceeded. Accordingly, in order to minimize occurrences of collapse and so forth of the work sheet, it is necessary to set the width pre-narrowing ratio $i_0$ within the range of 0<$i_0$≦8.0% (hatched area in FIG. 11). Accordingly, in order for the final corrugate body 11 to be worked and shaped by a stable and high speed roll forming method, the predetermined width narrowing ratio i should be 0<i≦8%+β, and particularly, when the stretch strain ratio β of the work sheet is 0≦β≦2.2%, the value i should be within the range of 0<i≦10.0%.

Profile Requirement B-2

While the crest and bottom portions of the corrugate lines have a predetermined bent width w due to the necessity of provision of a predetermined strength as described above, if a corrugate line 13' is formed to have, for example, a substantially trapezoidal cross section in which it is flat at the crest and bottom portions M and V, as shown in FIG. 12, in order to satisfy such requirement, then when it is worked and shaped by roll forming as described above, the trapezoidal flat faces at the crest and bottom portions of the corrugate line are subjected, when seen microscopically, to in-plane curving deformation mainly at bent portions near the center axes 11 and 12 of the ridges and grooves. Then, because the trapezoidal faces are flat, outside portions (hatched portions in FIG. 12) in a plane of the corrugate lines of the trapezoidal faces around the bent portions undergo stretching deformation due to strain. Thus, remarkable distortion deformation or breakage damage is caused in a concentrated manner, and this will prevent practical use of the product.

In order to solve such problem, various sectional shapes of the crest and bottom portions M and V should be as shown in FIGS. 9(A) to 9(D). In particular, a sectional shape of each of the crest and bottom portions M and V is formed such that either a flat face is eliminated (FIGS. 9(A-1), (A-2), (A-4), (B-1), (B-3), (C) or (D)) or a very restricted small flat face remains (FIGS. 9(A-3) or (B-2)). The former such examples provide in-plane curving deformation mainly of the bent portions involved in predetermined width narrowing in the y direction. This makes it easy to restrict as much as possible occurrences of residual distortion stress such as distortion deformation. As a result, it is possible to perfectly prevent occurrence of damage due to breaking and so forth. In the case of the latter such examples, since very small flat faces remain in sectional shapes of the crest and bottom portions, that is, since belt-like flat faces of a small width remain, the amount of local in-plane stretching distortion and in-plane curving deformation of the bent portions involved in predetermined width narrowing in the y direction are very small. Thus, damage due to breakage does not take place and residual distortion stress can almost be ignored.

Profile Requirement B-3

Figure 13A:
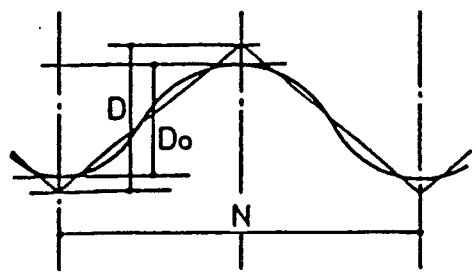
FIGS. 13(A)-13(H) are views of various waveforms showing meandering waveforms of corrugate lines of a composite corrugated body.
Figure 13B:
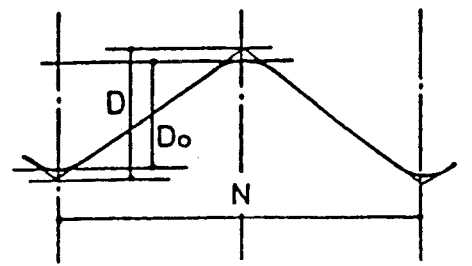
Figure 13C:
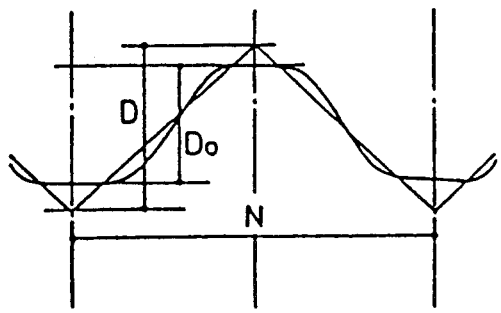
Figure 13D:
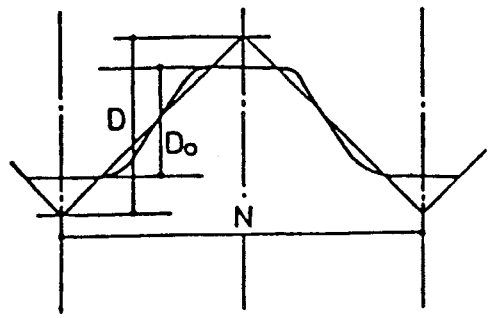
Figure 13E:
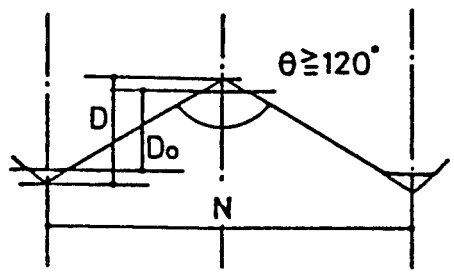
Figure 13F:
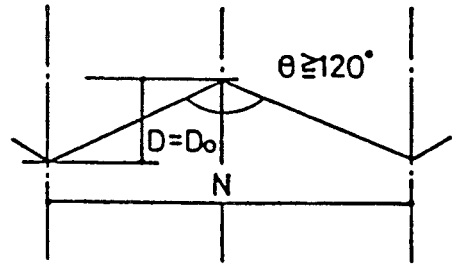
Figure 13G:
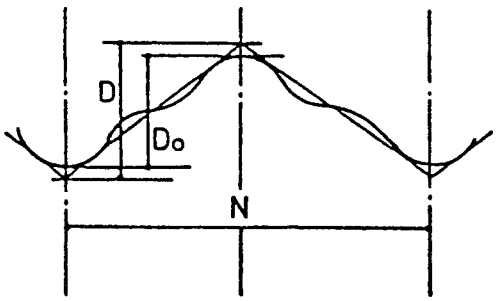
Figure 13H:
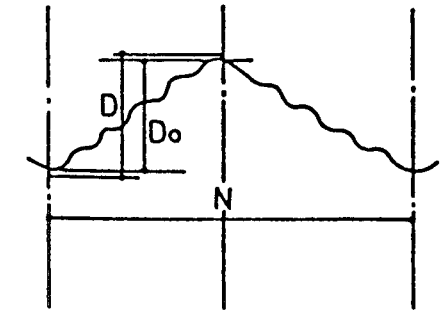

Further, according to the present invention, the meandering pattern of each of the corrugate lines 13 in the x-y plane is a smooth meandering pattern of a wave form shape. More particularly, the meandering pattern has the form of a continuous curve over the overall length of each corrugate line 13 (FIG. 13(A)), or has curved bent portions which are interconnected by straight lines (FIG. 13(B)), or has straight bent portions which are interconnected by curved lines (FIG. 13(C)), or has a trapezoidal shape formed by connection of straight line sections over the overall length with chamfered corner portions (FIG. 13(D)), or has a trapezoidal shape formed by connection of straight line sections over the overall length in a comparatively flat profile such that the interior angle $\theta$ between opposing oblique lines is greater than 120° (FIG. 13(E)), or has a comparatively flat zigzag pattern having an interior angle $\theta$ of 120° or more (FIG. 13(F)), or else has bent portions of curved line segments which are interconnected by wave-shaped curves of a comparatively small period (FIGS. 13(G) or (H)).

Various acute projections in the waveforms are not included in the meandering patterns of corrugate lines according to the present invention, which rather are formed to be smooth waveforms in the x-y plane as described above. This requires the tooth-shaped ribs 22 of the forming rollers 23 to be formed to have a meandering patterns of a smooth waveform shape. When roll forming, pressure applied to corrugated work sheet 24 is dispersed over a comparatively wide area by the tooth-shaped ribs 22. As a result, local distortion deformation is eliminated, and at the same time, slipping movement of the work sheet on the ribs upon stepwise feeding in the x direction is not at all obstructed. Thus, stretching distortion deformation in the x direction and occurrence of breakage resulting from such stretching distortion deformation is prevented. Further, slipping movement of the work sheet 24 on the tooth-shaped ribs 22 upon fine adjustment of width narrowing in the y direction is not at all obstructed. Thus, stretching distortion deformation in the y direction and occurrence of breakage resulting from such stretching distortion deformation can be restricted sufficiently. As a result, roll forming of a reinforced corrugated body of the present invention will be performed stably and at a high speed.

Requirements to Further Improve Workability

While good workability can be achieved by the profile requirements B-1 to B-3 described above, workability is further improved if the following requirements are met.

In particular, for convenience the work sheet is divided into an anterior wave portion (portion A) and a posterior wave portion (portion B) of the corrugate lines 13, as shown in FIGS. 14 and 15. Division of the work sheet into portion A and portion B is such that a forward portion in the advancing direction of the corrugated work sheet 24 to be inserted between the forming rollers 23 in order to form corrugate lines 13 is determined as the portion A while a rearward portion is determined as the portion B.

A width narrowing ratio $i_a$ at the anterior wave portion (portion A) should be lower than a width narrowing ratio $i_b$ at the posterior wave portion (portion B). Means for changing or achieving such difference in width narrowing ratio should be such that a total of y direction waveform components of the posterior wave portion B of a particular waveform should be greater than a total of y direction wave components of the anterior wave portion A thereof. A waveform component as employed herein denotes a gradient (angle) of a tangential line to each point on a continuous waveform.

Figure 14B:
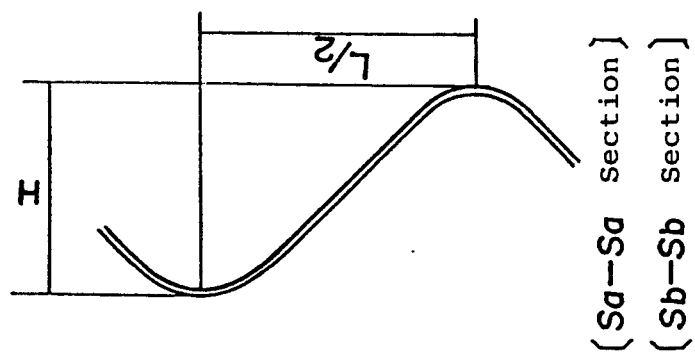
FIGS. 14(A)-14(B) are views showing a modification of the present invention.
Figure 14A:
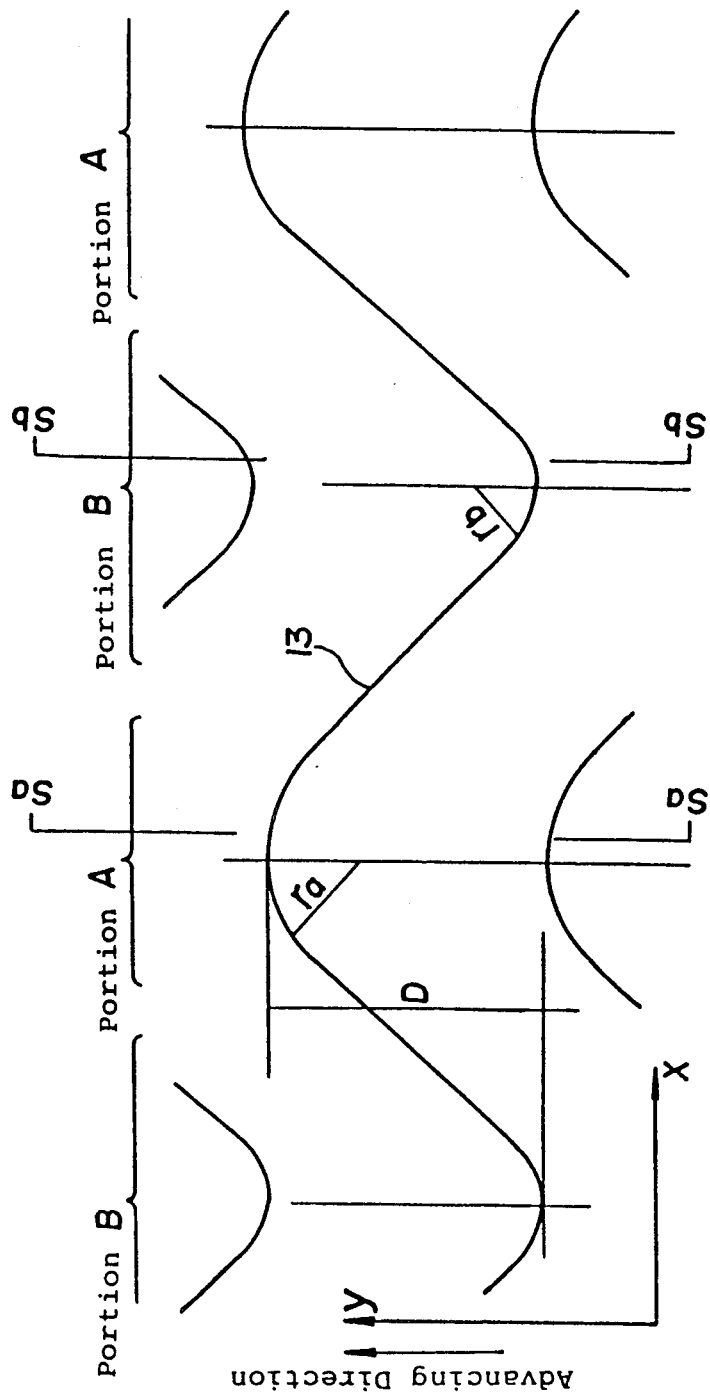
Figure 15B:
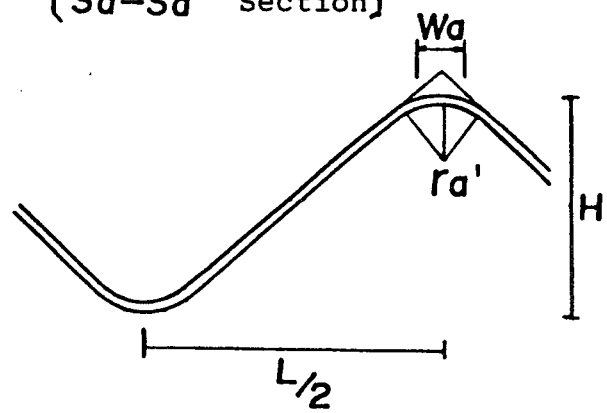

Such means can be that, for example, as shown in FIG. 14(A), a relationship between a curvature $r_a$ of the portion A and another curvature $r_b$ of the portion B in the waveforms of the corrugate lines 13 should be $r_a > r_b$. It is to be noted that, in this example, the sectional waveforms at the portions A and B are substantially similar as shown in FIG. 14(B).

Figure 15C:
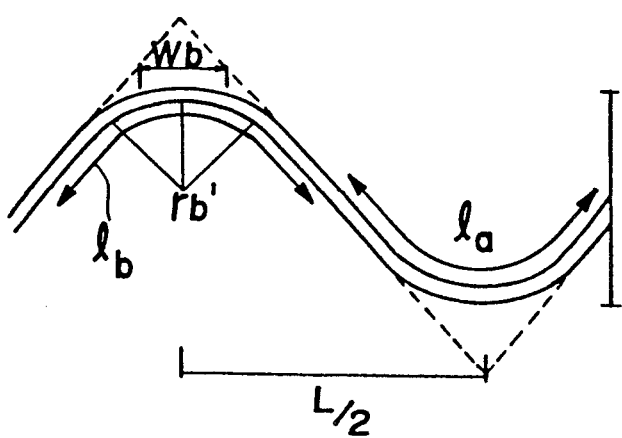
Figure 15D:
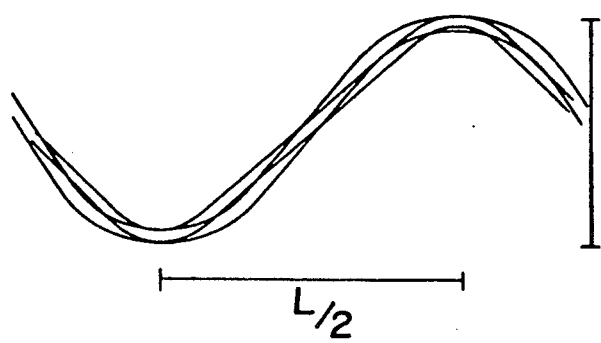

According to another such means, a sheet section extension lb (see FIG. 15(C)) of the posterior wave portion B per unit wavelength L of the sectional waveform is greater than a sheet section extension la of the anterior wave portion A. As employed herein, a sheet section extension denotes an actual total length of a sheet used for a unit wavelength. Thus, the length of stepwise movement of the portion B should be increased. In this example, contrary to the example described above, waveforms of the portions A and B in the x-y plane have substantially the same shapes (see FIG. 15(A)), but the sectional waveforms are different. In particular, as is apparent from FIGS. 15(B) to (D), a relationship between a curvature $r_a'$ of the portion A and a curvature $r_b'$ of the portion B, i.e. sectional waveforms along planes Sa and Sb in FIG. 15(A), should be $r_a' < r_b'$, or a difference should be provided between respective crests Wa and Wb.

It is to be noted that the means for changing the width narrowing ratio is not limited to the two embodiments described above. For example, such two means may be combined with each other, or a quite different technique may be adopted.

Where such means are employed, a reinforced corrugated body to be formed can be adjusted so that a predetermined low tensile force will be applied, during roll forming of the reinforced corrugated body, substantially equally and uniformly to portions of the sheet at both anterior portions and posterior portions of the waves of the meandering corrugate. Accordingly, even if the speed of rotation of the forming rollers 23 is raised, occurrence of relaxation or of excess wrinkling at a portion of the posterior wave portions or occurrence of stretching distortion and operating difficulties such as damage by tearing at a portion of the anterior wave portions can be restricted.

Total Profile Requirements

While preferably profile requirements for corrugate lines are attained only after the two necessary conditions for the strength and the production described above are satisfied, such requirements are particularly as follows.

Thus, the profile requirements are illustrated by a set of profile curves shown in the graph of FIG. 16, and the profile curve expression is represented as $H/L = f_i(D/N)$. It is to be noted that the substantial meandering overlapping ratio $D/L$ and the bent width w have no relationship to such profile curve expression. The profile curve expression stands independently of absolute values of the individual profile values H, L, D and N. In particular, the profile curve expression is composed of profile ratios and is a functional relationship in principle, describing only a profile characteristic of the present corrugated body 11 and then is independent of structural strength and high or low workability of the corrugated body.

More particularly, only one combination of H/L and D/N of variable values which satisfies the profile curve expression described above exists for one fixed value of the parameter variable constant i. For example, a combination of a value of the variable constant i and a value of the variable H/L decisively defines a value of the variable D/N. Also, a combination of a value of the variable constant i and value of the variable D/N decisively defines a value of the variable H/L. Also, a combination of values of the variables H/L and D/N decisively defines a value of the constant i. In other words, the relationship is substantially that the values of H/L and D/N change proportionally when the value of i is changed.

It is to be noted that the set of profile curves in FIG. 16 are a set of similar hyperbolas obtained by parallel movement, and only profile curves where the width narrowing ratio i is $5\% \leq i \leq 20\%$ are illustrated, while profile curves for $i < 5\%$ and $i > 20\%$ outside such range are omitted. Further, the set of profile curves has been drawn by measuring variations of profiles, that is, the substantial amplitude ratio H/L and the substantial meandering ratio D/N, of various portions worked and formed from actual corrugated bodies having different substantial meandering ratios D/N, where the substantial amplitude ratio H/L=0, while varying the width narrowing ratio i. Optimum ranges which simultaneously satisfy a substantial amplitude ratio and a width narrowing ratio among the profile requirements for structural strength and workability which are most important and essential in order to make practical use possible are such that a substantial amplitude ratio H/L is optimum at H/L=0.7 and the optimum range thereof is limited to $0.4 \leq H/L \leq 1.4$, while profile curves having an optimum width narrowing ratio i are limited to the range of $0 < i \leq 10\%$ (D/N). As a result, an optimum substantial meandering ratio D/N is limited to the range of $0 < D/N \leq 0.35$. A hatched area in the graph of FIG. 16 indicates the above optimum ranges.

Profile designing of corrugate lines of a reinforced corrugated body according to the present invention, profile designing of tooth-shaped ribs of a forming roller, and so forth can be performed efficiently using the present graph of FIG. 16, in which the optimum ranges of the profiles in the profile curve set are shown. It is useful in an application, for example, to a method wherein, after optimum H/L and i are set in advance, D/N is determined and designed to enable a reinforced corrugated body which has both a high structural strength and excellent workability, or to an automatic control system for a pre-corrugating roller (an apparatus for working a sheet in the form of a flat plate into a corrugated work sheet 24) which calculates and controls an i value which achieves the optimum H/L and D/N set in advance.

It is to be noted that the profile curves apply regardless of the type of material of the work sheet.

Results of Experiments

Three characteristic cases among many embodiments are described below.

In a first case, a reinforced corrugated body was formed using a paper sheet such that, in the profile of the corrugate lines, the substantial amplitude ratio is $H/L = 0.7$, the substantial meandering ratio is $D/N = 0.18$, the substantial meandering overlapping ratio is $D/L = 1.0$, the width narrowing ratio is $i = 5\%$, the waveform in the x-y plane is a smooth waveform consisting of continuous curves, and the crest and bottom portions of the corrugate lines have curved sectional shapes. The reinforced corrugate body was obtained by roll forming by heating type forming rollers without causing any operating difficulties at a speed of approximately 150 m per minute. The width pre-narrowing ratio was 5% and the stretch strain ratio was $\beta \approx 0$ upon roll forming. Thus, the reinforced corrugated body obtained has an ideal structure characterized in that it can be substantially developed topologically. Further, a reinforced composite corrugated body which was obtained by integrally applying two flat paper sheets to the opposite faces of the reinforced corrugated body was compared with a known corrugated board having an equal sheet material rib amplitude $H_0$, an equal sheet material rib period L and an equal sheet material rib bending width w. The result obtained was that, while the amount of use of the sheet increased by approximately 2%, the x direction maximum shearing strength increased by approximately 50% and the out-of-plane bending strength increased by approximately 60%.

In a second case, another reinforced corrugated body was formed using a paper sheet such that the substantial amplitude ratio of the corrugate lines is $H/L = 0.7$, the substantial meandering overlapping ratio is $D/L = 1.0$, the substantial meandering ratio is $D/N = 0.24$, the width narrowing ratio is $i = 8\%$, the meandering pattern of the corrugate lines has a smooth waveform in the x-y plane forming continuous curves, and the crest and bottom portions of the corrugate lines have curved sectional shapes. The reinforced corrugated body was obtained by roll forming by heating type forming rollers without causing any operating difficulties at a speed of approximately 100 m per minute. The width pre-narrowing ratio was 6.5% and the stretch strain ratio of the sheet was $\beta \approx 1.5\%$ upon roll forming. Thus, the reinforced corrugated body obtained is rather difficult to be developed topologically, and the material strength of the work sheet in the lateral direction is deteriorated more or less. Further, a reinforced composite corrugated body which was obtained by integrally applying two flat paper sheets to the opposite faces of the reinforced corrugated body was compared under the same conditions with the known corrugated board. As a result, it was confirmed that, while the amount of the work sheet used increased by approximately 3%, the x direction maximum shearing strength increased by approximately 55% and the out-of-plane bending strength increased by approximately 75%.

In a third case, a reinforced corrugated body was worked and formed by a roll forming method similar to that of the reinforced corrugated body of the first case, and a flat paper sheet was integrally applied to one face of the reinforced corrugated body. Forming was from a paper sheet having a similar profile to obtain a single faced reinforced corrugated body. The reinforced corrugated body obtained in this manner was compared with a known single faced corrugated board under the same conditions as to the material of the sheet, corrugate rib amplitude $h_0$, corrugate rib period L, corrugate rib bent width w and so forth. Excellent results confirmed that, while the amount of the sheet used increased by approximately 3%, the x direction bending strength increased by approximately 220%.

As seen in the above-mentioned first and second cases, since the increase in cost of the product compared with a known corrugated board was less that 10% (the increase of material was less than 4% and the increase of production cost due to reduction of the roll forming speed was less than 6%), and the various structural strengths were increased by 50%, the value of the product, i.e. strength/cost, is $\geq 150/110 = 1.36$. Thus, because other performances are equal, an increase in product value greater than about 40% was realized. In the third case, since the increase in cost of the product was restricted to 7% (the increase of material was less than 3% and the increase of the production cost was 4%), and the bending strength was increased by 220%, the value of the product, i.e. strength/cost, is $\geq 320/107 = 2.99$. Thus, because other performances are equal, an increase in product value greater than about 200% was realized.

Subsequently, the single faced reinforced composite corrugated body (H/L=0.5, D/L=1.1 and D/N—0.32) according to the present invention obtained in such a manner as described above was compared in strength with a conventional single faced corrugated board (H/L=0.5) as shown in FIGS. 18(A)-18(C).

Results of an examination of in-plane compression strength are shown in Table 1. As is apparent from Table 1, when a composite corrugated body which is used in the present invention is compared with a conventional single faced corrugated board, while the in-plane compression strength in the y direction is substantially the same, the composite corrugated body has a strength in the x direction as high as three times or more than that of the conventional single faced corrugated board.

Results of an examination of out-of-plane compression strength are shown in Table 2, and from this table, it is apparent that the single faced reinforced composite corrugated body which is used in the present invention has an out-of-plane compression strength higher by almost twice than that of the conventional single faced corrugated board.

Figure 17C:
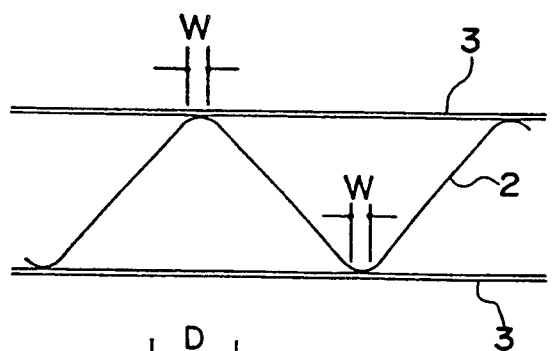
Figure 17D:
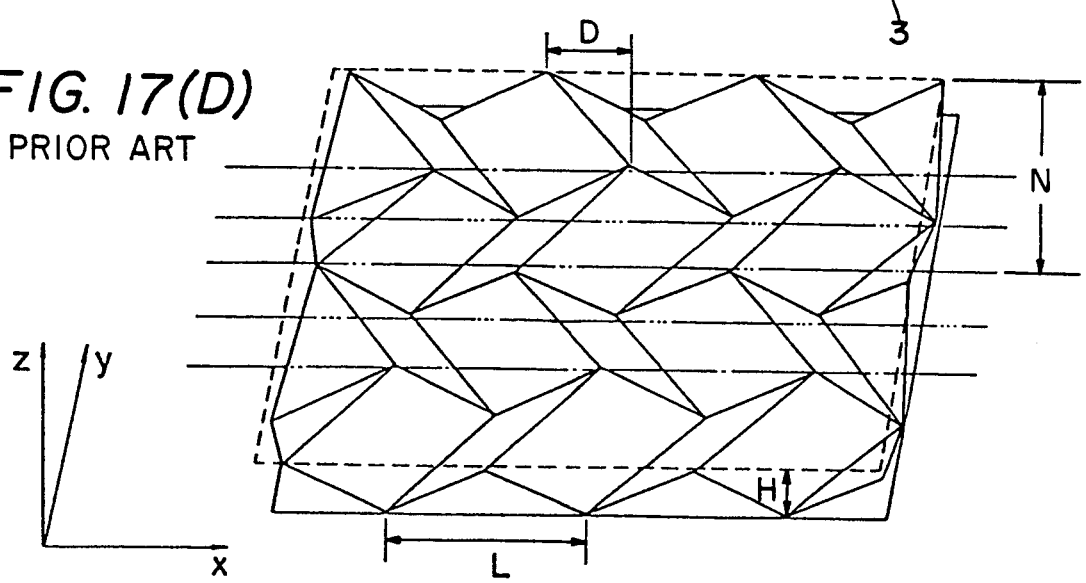
Figures 26A, 26B, 26C:
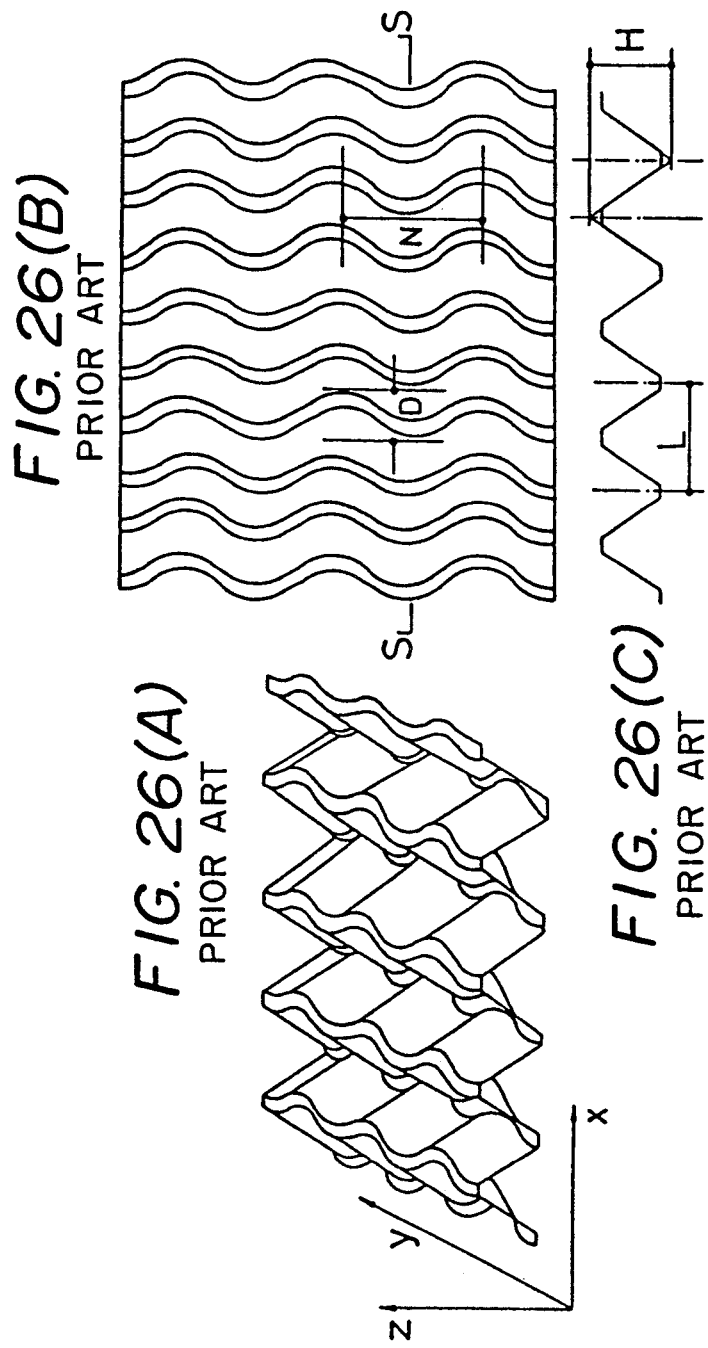
FIGS. 26(A)-26(C) are similar views showing a corrugated body of a ninth conventional example.

Results of an examination of out-of-plane bending strength in a direction of a plane perpendicular to the x direction in FIGS. 1 and 17(A) are shown in Table 3, and from this table, it is apparent that the single faced reinforced composite corrugated body according to the present invention has a very high bending strength which is about 22 times that of the conventional single faced corrugated board.

TABLE 1

| Results of Examination of In-plane Compression Strength | | |
|---|---|---|
| | Single Faced Corrugated Board | Composite Corrugated Body |
| y Direction In-Plane Compression Strength | 2.40 kgf | 2.52 kgf |
| Index of the Same | 100 | 105 |
| x Direction In-Plane Compression Strength | 0.82 kgf | 2.50 kgf |
| Index of the Same | 100 | 350 |

Specimen: BF: K180-Scp125
Method of Examination: Static pressurizing examination by column crush testing machine

TABLE 2

| Results of Examination of Out-of-Plane Compression Strength | | |
|---|---|---|
| | Single Faced Corrugated Board | Composite Corrugated Body |
| Vertical Direction Out-of-Plane Compression Strength | 1.51 kgf | 2.96 kgf |
| Index of the Same | 100 | 194 |

Specimen: The same as in Table 1
Method of Examination: Static pressurizing examination by column crush testing machine

TABLE 3

| Results of Examiner of Out-of-Plane Bending Strength | | |
|---|---|---|
| | Conventional Product | Composite Corrugated Body |
| Out-of-Plane Bending Strength in Plane Perpendicular to y Direction | 220 kgf | 227 kgf |
| Index of the Same | 100 | 105 |
| Out-of-Plane Bending Strength in Plane Perpendicular to x Direction | 8 kgf | 178 kgf |
| Index of the Same | 100 | 2225 |

Specimen: The same as in Table 1
Method of Examination: Static pressurizing examination by bending testing machine of 2-point supporting type As is apparent from the foregoing description, it can be said that the single faced reinforced composite corrugated body of the invention is very superior to the conventional single faced corrugated board with regard to various structural strengths.

I claim:

1. A reinforced composite corrugated body comprising:

a corrugated body formed of a sheet material having formed therein corrugate lines including, with respect to an x-y-z coordinate system, ridges and grooves formed alternately in an x direction and located in respective planes spaced in a z direction and parallel to an x-y plane, each said ridge and groove of each said corrugate line having a smooth meandering waveform in a y direction as viewed in said x-y plane, and said ridges and grooves defining a smooth meandering sectional waveform in said x direction as viewed in an x-z plane;

said sectional waveform having an amplitude H in said z direction and a wavelength L in said x direction defining a substantial amplitude ratio H/L such that $0.4 \leq H/L \leq 1.4$;

said meandering waveform of each said corrugate line having an amplitude D in said x direction and a wavelength N in said y direction defining a substantial meandering ratio $D/N \leq 0.35$;

said corrugate lines defining a substantial meandering overlapping ratio $D/L \geq 0.5$;

said corrugate lines being formed without substantial wrinkling or breakage thereof in said x direction as a result of said corrugate lines having a width narrowing ratio i, equal to an amount of contraction of said sheet material in said y direction after formation therein of said corrugate lines to a width in said y direction of said sheet material in the form of a flat sheet before formation therein of said corrugate lines, $\leq 8\%$ plus a stretch strain ratio of said sheet material;

said width narrowing ratio i, said substantial amplitude ratio H/L and said meandering ratio D/N substantially satisfying a profile curve relationship such that the values of H/L and D/N change proportionally when i is changed;

said waveform of each said corrugate line having crest and bottom portions spaced in said y direction, each said crest and bottom portion being curved or chamfered and having a relatively small dimension in said y direction; and a flat liner adhered to at least one opposite face of said corrugated body.

2. A reinforced composite corrugated body as claimed in claim 1, wherein said crest and bottom portions of said waveforms of said corrugate lines are entirely smoothly curved.

3. A reinforced composite corrugated body as claimed in claim 1, wherein said meandering overlapping ratio $D/L \geq 1.0$.

4. A reinforced composite corrugated body as claimed in claim 1, wherein said width narrowing ratio i at a portion of each said corrugate line on an anterior wave side thereof is smaller than that at a posterior wave side thereof.

5. A reinforced composite corrugated body as claimed in claim 1, wherein said substantial amplitude ratio H/L is approximately 0.7.

* * * * *